(12) United States Patent
Rose et al.

(10) Patent No.: US 8,718,279 B2
(45) Date of Patent: May 6, 2014

(54) APPARATUS AND METHOD FOR A SECURE BROADCAST SYSTEM

(75) Inventors: Gregory Gordon Rose, Concord (AU); James Semple, London (GB); Roy Franklin Quick, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1253 days.

(21) Appl. No.: 10/870,303

(22) Filed: Jun. 16, 2004

(65) Prior Publication Data

US 2005/0010774 A1    Jan. 13, 2005

Related U.S. Application Data

(60) Provisional application No. 60/485,791, filed on Jul. 8, 2003.

(51) Int. Cl.
*H04L 9/00* (2006.01)

(52) U.S. Cl.
USPC .......................................................... 380/44

(58) Field of Classification Search
USPC .......................................................... 380/44
See application file for complete search history.

(56) References Cited

U.S. PATENT DOCUMENTS

| | | | |
|---|---|---|---|
| 4,163,255 A | 7/1979 | Pires et al. | |
| 4,323,921 A | 4/1982 | Guillou et al. | |
| 4,336,612 A | 6/1982 | Inoue et al. | |
| 4,750,167 A | 6/1988 | Meyer et al. | |
| 4,870,408 A | 9/1989 | Zdunek et al. | |
| 4,881,263 A | 11/1989 | Herbison et al. | |
| 4,901,307 A | 2/1990 | Gilhousen et al. | |
| RE33,189 E | 3/1990 | Lee et al. | |
| 4,924,513 A | 5/1990 | Herbison et al. | |
| 5,052,000 A | 9/1991 | Wang et al. | |
| 5,056,109 A | 10/1991 | Gilhousen et al. | |
| 5,101,501 A | 3/1992 | Gilhousen et al. | |
| 5,103,459 A | 4/1992 | Gilhousen et al. | |
| 5,117,457 A | 5/1992 | Comerford et al. | |
| 5,136,586 A | 8/1992 | Greenblatt et al. | |
| 5,150,412 A | 9/1992 | Maru et al. | |

(Continued)

FOREIGN PATENT DOCUMENTS

| CA | 2308405 A1 | 11/2000 |
|---|---|---|
| CN | 1256599 A | 6/2000 |

(Continued)

OTHER PUBLICATIONS

Pannetrat et al., Authenticating Real-Time Packet Streams And Multicasts, 2002 IEEE. Computers and Communications, 2002. Proceedings. ISCC 2002. Seventh International Symposium on, pp. 490-495.

(Continued)

*Primary Examiner* — Teshome Hailu
(74) *Attorney, Agent, or Firm* — Chris Kim; Michael J. DeHaemer, Jr.

(57) ABSTRACT

Apparatus and method for provisioning an access key used for a controlled access broadcast service is disclosed. In one aspect, a method for secure processing in a device that securely stores a secret key comprises receiving a plurality of challenges from a network, generating a plurality of ciphering keys based on the secret key and the plurality of challenges, and generating an access key based on the plurality of ciphering keys.

34 Claims, 6 Drawing Sheets

(56) References Cited

U.S. PATENT DOCUMENTS

| | | | |
|---|---|---|---|
| 5,159,447 A | 10/1992 | Haskell et al. | |
| 5,164,988 A | 11/1992 | Matyas et al. | |
| 5,235,631 A | 8/1993 | Grube et al. | |
| 5,237,612 A | 8/1993 | Raith | |
| 5,241,598 A | 8/1993 | Raith | |
| 5,253,294 A | 10/1993 | Maurer et al. | |
| 5,257,396 A | 10/1993 | Auld, Jr. et al. | |
| 5,325,357 A | 6/1994 | Kimoto et al. | |
| 5,351,087 A | 9/1994 | Christopher et al. | |
| 5,353,332 A | 10/1994 | Raith et al. | |
| 5,363,379 A | 11/1994 | Eckenrode et al. | |
| 5,365,572 A | 11/1994 | Saegusa et al. | |
| 5,369,784 A | 11/1994 | Nelson et al. | |
| 5,371,794 A | 12/1994 | Diffie et al. | |
| 5,404,563 A | 4/1995 | Green et al. | |
| 5,410,602 A | 4/1995 | Finkelstein et al. | |
| 5,412,655 A | 5/1995 | Yamada et al. | |
| 5,421,006 A | 5/1995 | Jablon et al. | |
| 5,442,626 A | 8/1995 | Wei | |
| 5,448,568 A | 9/1995 | Delpuch et al. | |
| 5,467,398 A | 11/1995 | Pierce et al. | |
| 5,473,609 A | 12/1995 | Chaney et al. | |
| 5,473,642 A | 12/1995 | Osawa et al. | |
| 5,481,613 A | 1/1996 | Ford et al. | |
| 5,485,577 A | 1/1996 | Eyer et al. | |
| 5,504,773 A | 4/1996 | Padovani et al. | |
| 5,513,245 A | 4/1996 | Mizikovsky et al. | |
| 5,515,441 A | 5/1996 | Faucher et al. | |
| 5,537,474 A | 7/1996 | Brown et al. | |
| 5,565,909 A | 10/1996 | Thibadeau et al. | |
| 5,592,470 A | 1/1997 | Rudrapatna et al. | |
| 5,659,556 A | 8/1997 | Denissen et al. | |
| 5,673,259 A | 9/1997 | Quick, Jr. et al. | |
| 5,686,963 A | 11/1997 | Uz et al. | |
| 5,708,961 A | 1/1998 | Hylton et al. | |
| 5,729,540 A | 3/1998 | Wegrzyn et al. | |
| 5,740,246 A | 4/1998 | Saito | |
| 5,748,736 A | 5/1998 | Mittra | |
| 5,751,707 A | 5/1998 | Voit et al. | |
| 5,751,725 A | 5/1998 | Chen | |
| 5,758,068 A | 5/1998 | Brandt et al. | |
| 5,758,291 A | 5/1998 | Grube et al. | |
| 5,768,276 A | 6/1998 | Diachina et al. | |
| 5,774,496 A | 6/1998 | Butler et al. | |
| 5,778,059 A | 7/1998 | Loghmani et al. | |
| 5,778,069 A | 7/1998 | Thomlinson et al. | |
| 5,778,187 A | 7/1998 | Monteiro et al. | |
| 5,787,347 A | 7/1998 | Yu et al. | |
| 5,796,829 A | 8/1998 | Newby et al. | |
| 5,835,730 A | 11/1998 | Grossman et al. | |
| 5,850,444 A | 12/1998 | Rune et al. | |
| 5,850,445 A | 12/1998 | Chan et al. | |
| 5,870,474 A | 2/1999 | Wasilewski et al. | |
| 5,878,141 A | 3/1999 | Daly et al. | |
| 5,881,368 A | 3/1999 | Grob et al. | |
| 5,884,196 A | 3/1999 | Lekven et al. | |
| 5,887,252 A | 3/1999 | Noneman et al. | |
| 5,909,491 A | 6/1999 | Luo et al. | |
| 5,923,649 A | 7/1999 | Raith et al. | |
| 5,936,965 A | 8/1999 | Doshi et al. | |
| 5,940,507 A | 8/1999 | Cane et al. | |
| 5,946,316 A | 8/1999 | Chen et al. | |
| 5,956,404 A | 9/1999 | Schneier et al. | |
| 5,956,681 A | 9/1999 | Yamakita | |
| 5,970,072 A | 10/1999 | Gammenthaler, Jr. et al. | |
| 5,970,417 A | 10/1999 | Toyryla et al. | |
| 5,978,386 A | 11/1999 | Hamalainen et al. | |
| 5,983,099 A | 11/1999 | Yao et al. | |
| 5,983,388 A | 11/1999 | Friedman et al. | |
| 5,990,928 A | 11/1999 | Sklar et al. | |
| 5,991,400 A | 11/1999 | Kamperman et al. | |
| 5,991,407 A * | 11/1999 | Murto | 380/248 |
| 6,006,073 A | 12/1999 | Glauner et al. | |
| 6,014,765 A | 1/2000 | Maeda et al. | |
| 6,018,360 A | 1/2000 | Stewart et al. | |
| 6,021,124 A | 2/2000 | Haartsen et al. | |
| 6,026,165 A | 2/2000 | Marino et al. | |
| 6,032,197 A | 2/2000 | Birdwell et al. | |
| 6,044,154 A | 3/2000 | Kelly et al. | |
| 6,047,071 A | 4/2000 | Shah et al. | |
| 6,047,395 A | 4/2000 | Zook et al. | |
| 6,052,812 A | 4/2000 | Chen et al. | |
| 6,055,236 A | 4/2000 | Nessett et al. | |
| 6,055,314 A | 4/2000 | Spies et al. | |
| 6,058,289 A | 5/2000 | Gardner et al. | |
| 6,065,061 A | 5/2000 | Blahut et al. | |
| 6,067,290 A | 5/2000 | Paulraj et al. | |
| 6,073,122 A | 6/2000 | Wool et al. | |
| 6,081,907 A | 6/2000 | Witty et al. | |
| 6,097,817 A * | 8/2000 | Bilgic et al. | 380/270 |
| 6,098,878 A * | 8/2000 | Dent et al. | 235/380 |
| 6,108,424 A | 8/2000 | Pitiot et al. | |
| 6,108,706 A | 8/2000 | Birdwell et al. | |
| 6,111,866 A | 8/2000 | Kweon et al. | |
| 6,122,763 A | 9/2000 | Pyndiah et al. | |
| 6,128,389 A | 10/2000 | Chan et al. | |
| 6,128,490 A | 10/2000 | Shaheen et al. | |
| 6,148,010 A | 11/2000 | Sutton et al. | |
| 6,157,719 A | 12/2000 | Wasilewski et al. | |
| 6,172,972 B1 | 1/2001 | Birdwell et al. | |
| 6,185,430 B1 | 2/2001 | Yee et al. | |
| 6,195,546 B1 | 2/2001 | Leung et al. | |
| 6,199,161 B1 | 3/2001 | Ahvenainen et al. | |
| 6,201,961 B1 | 3/2001 | Schindall et al. | |
| 6,208,634 B1 | 3/2001 | Boulos et al. | |
| 6,230,024 B1 | 5/2001 | Wang et al. | |
| 6,233,234 B1 | 5/2001 | Curry et al. | |
| 6,233,341 B1 | 5/2001 | Riggins et al. | |
| 6,240,091 B1 | 5/2001 | Ginzboorg et al. | |
| 6,253,069 B1 | 6/2001 | Mankovitz et al. | |
| 6,253,326 B1 | 6/2001 | Lincke et al. | |
| 6,256,509 B1 | 7/2001 | Tanaka et al. | |
| 6,266,420 B1 | 7/2001 | Langford et al. | |
| 6,272,632 B1 | 8/2001 | Carman et al. | |
| 6,295,361 B1 | 9/2001 | Kadansky et al. | |
| 6,310,661 B1 | 10/2001 | Arsenault et al. | |
| 6,314,095 B1 | 11/2001 | Loa et al. | |
| 6,343,280 B2 | 1/2002 | Clark et al. | |
| 6,345,307 B1 | 2/2002 | Booth et al. | |
| 6,353,614 B1 | 3/2002 | Borella et al. | |
| 6,363,242 B1 | 3/2002 | Brown, Jr. et al. | |
| 6,363,480 B1 | 3/2002 | Perlman et al. | |
| 6,366,776 B1 | 4/2002 | Wright et al. | |
| 6,373,829 B1 | 4/2002 | Vilmur et al. | |
| 6,374,103 B1 | 4/2002 | Kamel et al. | |
| 6,377,810 B1 | 4/2002 | Geiger et al. | |
| 6,385,200 B1 | 5/2002 | Erami et al. | |
| 6,385,461 B1 | 5/2002 | Raith et al. | |
| 6,415,312 B1 | 7/2002 | Boivie | |
| 6,424,717 B1 | 7/2002 | Pinder et al. | |
| 6,424,947 B1 | 7/2002 | Tsuria et al. | |
| 6,434,367 B1 | 8/2002 | Kumar et al. | |
| 6,438,612 B1 | 8/2002 | Ylonen et al. | |
| 6,449,491 B1 | 9/2002 | Dailey et al. | |
| 6,460,156 B1 | 10/2002 | Laukkanen et al. | |
| 6,463,155 B1 | 10/2002 | Akiyama et al. | |
| 6,473,419 B1 | 10/2002 | Gray et al. | |
| 6,473,858 B1 | 10/2002 | Shimomura et al. | |
| 6,477,377 B2 | 11/2002 | Backstrom et al. | |
| 6,490,259 B1 | 12/2002 | Agrawal et al. | |
| 6,502,140 B1 | 12/2002 | Boivie | |
| 6,507,590 B1 | 1/2003 | Terho et al. | |
| 6,510,515 B1 | 1/2003 | Raith et al. | |
| RE38,007 E | 2/2003 | Tsukamoto et al. | |
| 6,519,266 B1 | 2/2003 | Manning et al. | |
| 6,523,069 B1 | 2/2003 | Luczycki et al. | |
| 6,529,740 B1 | 3/2003 | Ganucheau, Jr. et al. | |
| 6,536,041 B1 | 3/2003 | Knudson et al. | |
| 6,538,996 B1 | 3/2003 | West et al. | |
| 6,539,242 B1 | 3/2003 | Bayley | |
| 6,542,490 B1 | 4/2003 | Ahmadvand et al. | |
| 6,542,504 B1 | 4/2003 | Mahler et al. | |
| 6,549,771 B2 | 4/2003 | Chang et al. | |
| 6,560,206 B1 | 5/2003 | Naden et al. | |

(56) References Cited

U.S. PATENT DOCUMENTS

| | | | |
|---|---|---|---|
| 6,564,211 B1 | 5/2003 | Andreev et al. | |
| 6,567,914 B1 | 5/2003 | Just et al. | |
| 6,571,109 B1 | 5/2003 | Kim et al. | |
| 6,574,211 B2 | 6/2003 | Padovani et al. | |
| 6,577,734 B1 | 6/2003 | Etzel et al. | |
| 6,577,848 B1 | 6/2003 | Gregg et al. | |
| 6,580,756 B1 | 6/2003 | Matsui et al. | |
| 6,598,203 B1 | 7/2003 | Tang et al. | |
| 6,600,745 B1 | 7/2003 | Chopping et al. | |
| 6,601,068 B1 | 7/2003 | Park et al. | |
| 6,603,857 B1 * | 8/2003 | Batten-Carew et al. | 380/44 |
| 6,606,706 B1 | 8/2003 | Li et al. | |
| 6,608,841 B1 | 8/2003 | Koodli et al. | |
| 6,614,804 B1 | 9/2003 | McFadden et al. | |
| 6,633,979 B1 * | 10/2003 | Smeets | 713/151 |
| 6,640,094 B1 | 10/2003 | Tabeta | |
| 6,647,000 B1 | 11/2003 | Persson et al. | |
| 6,654,384 B1 | 11/2003 | Reza et al. | |
| 6,658,463 B1 | 12/2003 | Dillon et al. | |
| 6,658,605 B1 | 12/2003 | Yoshida et al. | |
| 6,665,718 B1 | 12/2003 | Chuah et al. | |
| 6,678,856 B1 | 1/2004 | Jordan et al. | |
| 6,680,920 B1 | 1/2004 | Wan et al. | |
| 6,690,795 B1 | 2/2004 | Richards et al. | |
| 6,704,368 B1 | 3/2004 | Nefedov et al. | |
| 6,704,369 B1 | 3/2004 | Kawasaki et al. | |
| 6,707,801 B2 | 3/2004 | Hsu | |
| 6,711,182 B1 | 3/2004 | Gibbs et al. | |
| 6,714,650 B1 | 3/2004 | Maillard et al. | |
| 6,714,784 B1 | 3/2004 | Forssell et al. | |
| 6,721,805 B1 | 4/2004 | Bhagwat et al. | |
| 6,725,459 B2 | 4/2004 | Bacon et al. | |
| 6,728,226 B1 | 4/2004 | Naito | |
| 6,731,936 B2 | 5/2004 | Chen et al. | |
| 6,735,177 B1 | 5/2004 | Suzuki et al. | |
| 6,735,190 B1 | 5/2004 | Chuah et al. | |
| 6,738,942 B1 | 5/2004 | Sridharan et al. | |
| 6,751,218 B1 | 6/2004 | Hagirahim et al. | |
| 6,760,602 B2 | 7/2004 | Tangorra et al. | |
| 6,760,752 B1 | 7/2004 | Liu et al. | |
| 6,763,025 B2 | 7/2004 | Leatherbury et al. | |
| 6,765,909 B1 | 7/2004 | Sen et al. | |
| 6,766,024 B1 | 7/2004 | Rix et al. | |
| 6,775,303 B1 | 8/2004 | Rustad et al. | |
| 6,781,999 B2 | 8/2004 | Eyuboglu et al. | |
| 6,788,681 B1 | 9/2004 | Hurren et al. | |
| 6,792,048 B1 | 9/2004 | Lee et al. | |
| 6,798,791 B1 | 9/2004 | Riazi et al. | |
| 6,801,508 B1 | 10/2004 | Lim et al. | |
| 6,804,520 B1 | 10/2004 | Johansson et al. | |
| 6,810,499 B2 | 10/2004 | Sridharan et al. | |
| 6,819,930 B1 | 11/2004 | Laroia et al. | |
| 6,826,406 B1 | 11/2004 | Vialen et al. | |
| 6,829,741 B1 | 12/2004 | Khansari et al. | |
| 6,831,910 B1 | 12/2004 | Moon et al. | |
| 6,832,314 B1 | 12/2004 | Irvin et al. | |
| 6,856,800 B1 | 2/2005 | Henry et al. | |
| 6,862,684 B1 | 3/2005 | DiGiorgio | |
| 6,870,923 B2 | 3/2005 | Yi et al. | |
| 6,879,573 B1 | 4/2005 | Huo et al. | |
| 6,879,690 B2 | 4/2005 | Faccin et al. | |
| 6,882,850 B2 | 4/2005 | McConnell et al. | |
| 6,882,860 B1 | 4/2005 | Kim et al. | |
| 6,885,874 B2 | 4/2005 | Grube et al. | |
| 6,888,899 B2 | 5/2005 | Raleigh et al. | |
| 6,895,216 B2 | 5/2005 | Sato et al. | |
| 6,895,546 B2 | 5/2005 | Ivry | |
| 6,898,285 B1 | 5/2005 | Hutchings et al. | |
| 6,898,640 B1 | 5/2005 | Kurita et al. | |
| 6,909,702 B2 | 6/2005 | Leung et al. | |
| 6,915,272 B1 * | 7/2005 | Zilliacus et al. | 705/26 |
| 6,918,035 B1 | 7/2005 | Patel et al. | |
| 6,920,119 B2 | 7/2005 | Rinchiuso | |
| 6,925,285 B2 | 8/2005 | Kim et al. | |
| 6,944,763 B1 | 9/2005 | Asano et al. | |
| 6,952,454 B1 | 10/2005 | Jalali et al. | |
| 6,956,833 B1 | 10/2005 | Yukie et al. | |
| 6,959,384 B1 | 10/2005 | Serret-Avila | |
| 6,963,544 B1 | 11/2005 | Balachandran et al. | |
| 6,970,689 B2 | 11/2005 | Khorram | |
| 6,978,143 B1 | 12/2005 | Vialen | |
| 6,983,410 B2 | 1/2006 | Chen et al. | |
| 6,987,982 B2 | 1/2006 | Willenegger et al. | |
| 6,990,680 B1 | 1/2006 | Wugofski et al. | |
| 7,016,351 B1 | 3/2006 | Farinacci et al. | |
| 7,024,616 B2 | 4/2006 | Ohira et al. | |
| 7,031,666 B2 | 4/2006 | Hsu | |
| 7,036,023 B2 | 4/2006 | Fries et al. | |
| 7,039,180 B1 | 5/2006 | Issaa et al. | |
| 7,046,672 B2 | 5/2006 | Liao et al. | |
| 7,058,809 B2 | 6/2006 | White et al. | |
| 7,069,436 B1 | 6/2006 | Akachi | |
| 7,072,865 B2 | 7/2006 | Akiyama et al. | |
| 7,079,502 B2 | 7/2006 | Yamano et al. | |
| 7,079,523 B2 | 7/2006 | Nelson, Jr. et al. | |
| 7,096,355 B1 | 8/2006 | Marvit et al. | |
| 7,114,175 B2 | 9/2006 | Lahteenmaki et al. | |
| 7,116,892 B2 | 10/2006 | Wajs | |
| 7,133,353 B2 | 11/2006 | Sourour et al. | |
| 7,134,019 B2 * | 11/2006 | Shelest et al. | 713/170 |
| 7,177,424 B1 | 2/2007 | Furuya et al. | |
| 7,181,620 B1 | 2/2007 | Hur | |
| 7,184,789 B2 | 2/2007 | Leung et al. | |
| 7,185,362 B2 | 2/2007 | Hawkes et al. | |
| 7,197,072 B1 | 3/2007 | Hsu et al. | |
| 7,200,230 B2 | 4/2007 | Knauft et al. | |
| 7,203,314 B1 | 4/2007 | Kahn et al. | |
| 7,209,459 B2 | 4/2007 | Kangas et al. | |
| 7,215,775 B2 | 5/2007 | Noguchi et al. | |
| 7,219,291 B2 | 5/2007 | Adde et al. | |
| 7,237,108 B2 | 6/2007 | Medvinsky et al. | |
| 7,239,704 B1 | 7/2007 | Maillard et al. | |
| 7,266,687 B2 | 9/2007 | Sowa et al. | |
| 7,278,164 B2 | 10/2007 | Raiz et al. | |
| 7,280,660 B2 | 10/2007 | Salo et al. | |
| 7,290,063 B2 | 10/2007 | Kalliokulju et al. | |
| 7,301,968 B2 | 11/2007 | Haran et al. | |
| 7,308,100 B2 | 12/2007 | Bender et al. | |
| 7,349,425 B2 | 3/2008 | Leung et al. | |
| 7,352,868 B2 | 4/2008 | Hawkes et al. | |
| 7,376,963 B2 | 5/2008 | Kato et al. | |
| 7,599,497 B2 | 10/2009 | Soppera | |
| 7,599,655 B2 | 10/2009 | Agashe et al. | |
| 7,649,829 B2 | 1/2010 | Chen et al. | |
| 7,669,104 B2 | 2/2010 | Uchida et al. | |
| 7,693,508 B2 | 4/2010 | Leung et al. | |
| 7,697,523 B2 | 4/2010 | Leung et al. | |
| 7,742,781 B2 | 6/2010 | Chen et al. | |
| 7,792,074 B2 | 9/2010 | Chen et al. | |
| 8,077,679 B2 | 12/2011 | Leung | |
| 8,098,818 B2 | 1/2012 | Grilli et al. | |
| 8,121,296 B2 | 2/2012 | Hawkes et al. | |
| 2001/0004761 A1 | 6/2001 | Zehavi et al. | |
| 2001/0029581 A1 | 10/2001 | Knauft et al. | |
| 2001/0034254 A1 | 10/2001 | Ranta | |
| 2001/0036200 A1 | 11/2001 | Nelson et al. | |
| 2001/0036834 A1 | 11/2001 | Das et al. | |
| 2001/0055298 A1 | 12/2001 | Baker et al. | |
| 2002/0001386 A1 | 1/2002 | Akiyama et al. | |
| 2002/0002541 A1 | 1/2002 | Williams et al. | |
| 2002/0002674 A1 | 1/2002 | Grimes et al. | |
| 2002/0010681 A1 | 1/2002 | Hillegass et al. | |
| 2002/0014159 A1 | 2/2002 | Tatsumi et al. | |
| 2002/0021809 A1 | 2/2002 | Salo et al. | |
| 2002/0023165 A1 | 2/2002 | Lahr et al. | |
| 2002/0071558 A1 | 6/2002 | Patel | |
| 2002/0076195 A1 | 6/2002 | Nakajima et al. | |
| 2002/0080887 A1 | 6/2002 | Jeong et al. | |
| 2002/0091860 A1 | 7/2002 | Kalliokulju et al. | |
| 2002/0091931 A1 * | 7/2002 | Quick et al. | 713/182 |
| 2002/0097722 A1 | 7/2002 | Liao et al. | |
| 2002/0099949 A1 | 7/2002 | Fries et al. | |
| 2002/0102964 A1 | 8/2002 | Park | |
| 2002/0112234 A1 | 8/2002 | Bacon et al. | |

(56) References Cited

U.S. PATENT DOCUMENTS

| | | | |
|---|---|---|---|
| 2002/0114469 A1 | 8/2002 | Faccin et al. | |
| 2002/0141371 A1 | 10/2002 | Hsu | |
| 2002/0141591 A1* | 10/2002 | Hawkes et al. | 380/278 |
| 2002/0152384 A1* | 10/2002 | Shelest et al. | 713/176 |
| 2002/0154781 A1 | 10/2002 | Sowa et al. | |
| 2002/0164025 A1 | 11/2002 | Raiz et al. | |
| 2002/0169724 A1 | 11/2002 | Moroney et al. | |
| 2002/0176408 A1 | 11/2002 | Kangas et al. | |
| 2002/0181423 A1 | 12/2002 | Chen et al. | |
| 2003/0009669 A1 | 1/2003 | White et al. | |
| 2003/0014685 A1 | 1/2003 | Chong et al. | |
| 2003/0018891 A1 | 1/2003 | Hall et al. | |
| 2003/0028805 A1 | 2/2003 | Lahteenmaki | |
| 2003/0030581 A1 | 2/2003 | Roy | |
| 2003/0031322 A1 | 2/2003 | Beckmann et al. | |
| 2003/0035389 A1 | 2/2003 | Chen et al. | |
| 2003/0039237 A1 | 2/2003 | Forslow et al. | |
| 2003/0039361 A1* | 2/2003 | Hawkes et al. | 380/278 |
| 2003/0054807 A1 | 3/2003 | Hsu et al. | |
| 2003/0064679 A1 | 4/2003 | Kim et al. | |
| 2003/0070092 A1* | 4/2003 | Hawkes et al. | 713/201 |
| 2003/0072384 A1 | 4/2003 | Chen et al. | |
| 2003/0087653 A1 | 5/2003 | Leung et al. | |
| 2003/0101401 A1 | 5/2003 | Salvi et al. | |
| 2003/0123669 A1 | 7/2003 | Koukoulidis et al. | |
| 2003/0126440 A1 | 7/2003 | Go et al. | |
| 2003/0134655 A1 | 7/2003 | Chen et al. | |
| 2003/0135748 A1 | 7/2003 | Yamada et al. | |
| 2003/0157952 A1 | 8/2003 | Sarkkinen et al. | |
| 2003/0159029 A1 | 8/2003 | Brown et al. | |
| 2003/0217057 A1 | 11/2003 | Kuroiwa et al. | |
| 2004/0005860 A1 | 1/2004 | Kato et al. | |
| 2004/0019787 A1 | 1/2004 | Shibata et al. | |
| 2004/0022216 A1 | 2/2004 | Shi et al. | |
| 2004/0095515 A1 | 5/2004 | Tajima et al. | |
| 2004/0101138 A1 | 5/2004 | Revital et al. | |
| 2004/0107350 A1 | 6/2004 | Wasilewski et al. | |
| 2004/0120527 A1* | 6/2004 | Hawkes et al. | 380/277 |
| 2004/0131185 A1 | 7/2004 | Kakumer et al. | |
| 2004/0132402 A1 | 7/2004 | Agashe et al. | |
| 2004/0151317 A1 | 8/2004 | Hyyppa et al. | |
| 2004/0199474 A1 | 10/2004 | Ritter | |
| 2004/0202329 A1* | 10/2004 | Jung et al. | 380/273 |
| 2004/0243808 A1 | 12/2004 | Ishiguro et al. | |
| 2004/0266391 A1 | 12/2004 | Hafren et al. | |
| 2005/0008159 A1 | 1/2005 | Grilli et al. | |
| 2005/0048963 A1 | 3/2005 | Kubler et al. | |
| 2005/0055551 A1 | 3/2005 | Becker et al. | |
| 2005/0063544 A1 | 3/2005 | Uusitalo et al. | |
| 2005/0108563 A1 | 5/2005 | Becker et al. | |
| 2005/0138379 A1 | 6/2005 | Semple et al. | |
| 2005/0144550 A1 | 6/2005 | Jeon et al. | |
| 2005/0165711 A1 | 7/2005 | Hamatsu | |
| 2005/0216731 A1 | 9/2005 | Saito et al. | |
| 2005/0238315 A1 | 10/2005 | Kataoka | |
| 2005/0271210 A1 | 12/2005 | Soppera et al. | |
| 2006/0078000 A1 | 4/2006 | Rinne et al. | |
| 2006/0168446 A1 | 7/2006 | Ahonen et al. | |
| 2006/0171540 A1* | 8/2006 | Lee et al. | 380/277 |
| 2006/0242412 A1 | 10/2006 | Jung et al. | |
| 2007/0038610 A1 | 2/2007 | Omoigui et al. | |
| 2007/0116282 A1 | 5/2007 | Hawkes et al. | |
| 2007/0214482 A1 | 9/2007 | Nguyen et al. | |
| 2007/0280169 A1 | 12/2007 | Cam Winget | |
| 2008/0226073 A1 | 9/2008 | Hawkes et al. | |
| 2010/0048206 A1 | 2/2010 | Agashe et al. | |
| 2010/0107041 A1 | 4/2010 | Chen et al. | |
| 2010/0142432 A1 | 6/2010 | Leung et al. | |
| 2010/0272124 A1 | 10/2010 | Chen et al. | |
| 2011/0045864 A1 | 2/2011 | Chen et al. | |

FOREIGN PATENT DOCUMENTS

| | | |
|---|---|---|
| CN | 1281561 A | 1/2001 |
| EP | 0636963 A2 | 2/1995 |
| EP | 0702477 A2 | 3/1996 |
| EP | 0748058 A2 | 12/1996 |
| EP | 0813309 A2 | 12/1997 |
| EP | 0854618 A2 | 7/1998 |
| EP | 0924898 A1 | 6/1999 |
| EP | 0928084 A2 | 7/1999 |
| EP | 0951198 A2 | 10/1999 |
| EP | 0993128 A1 | 4/2000 |
| EP | 0999656 A1 | 5/2000 |
| EP | 1001570 A2 | 5/2000 |
| EP | 1024661 A2 | 8/2000 |
| EP | 1030484 A2 | 8/2000 |
| EP | 1032150 A2 | 8/2000 |
| EP | 1071296 A1 | 1/2001 |
| EP | 1075118 A2 | 2/2001 |
| EP | 1075123 A1 | 2/2001 |
| EP | 1098446 A2 | 5/2001 |
| EP | 1117204 A2 | 7/2001 |
| EP | 1134951 A2 | 9/2001 |
| EP | 1143635 A1 | 10/2001 |
| EP | 1185125 A1 | 3/2002 |
| EP | 1190526 A1 | 3/2002 |
| EP | 1213943 A1 | 6/2002 |
| EP | 1248188 A1 | 10/2002 |
| EP | 1374477 A1 | 1/2004 |
| EP | 2204940 | 7/2010 |
| GB | 2346512 A | 8/2000 |
| JP | 1101042 A | 4/1989 |
| JP | 02090840 | 3/1990 |
| JP | 03179841 | 5/1991 |
| JP | 5216411 A | 8/1993 |
| JP | 06125554 | 5/1994 |
| JP | 7115414 | 5/1995 |
| JP | 7193569 A | 7/1995 |
| JP | 7288798 | 10/1995 |
| JP | 9135478 A | 5/1997 |
| JP | 9331314 A | 12/1997 |
| JP | 10023529 A | 1/1998 |
| JP | 10051380 A | 2/1998 |
| JP | 10063598 A | 3/1998 |
| JP | 10093547 | 4/1998 |
| JP | 10093547 A | 4/1998 |
| JP | 10191459 | 7/1998 |
| JP | 10200536 A | 7/1998 |
| JP | 10214233 | 8/1998 |
| JP | 10240826 | 11/1998 |
| JP | 10512428 | 11/1998 |
| JP | 11110401 A | 4/1999 |
| JP | 11127468 | 5/1999 |
| JP | 11136669 A | 5/1999 |
| JP | 11161167 | 6/1999 |
| JP | 11243569 A | 9/1999 |
| JP | 11510668 T | 9/1999 |
| JP | 11313059 A | 11/1999 |
| JP | 11331070 A | 11/1999 |
| JP | 11331150 A | 11/1999 |
| JP | 11513853 | 11/1999 |
| JP | 11345179 A | 12/1999 |
| JP | 11355460 | 12/1999 |
| JP | 11355858 A | 12/1999 |
| JP | 2000040064 A | 2/2000 |
| JP | 2000078555 A | 3/2000 |
| JP | 2000115860 | 4/2000 |
| JP | 2000134193 | 5/2000 |
| JP | 2000137551 A | 5/2000 |
| JP | 2000138632 A | 5/2000 |
| JP | 2000165258 A | 6/2000 |
| JP | 2000183968 A | 6/2000 |
| JP | 2000196546 A | 7/2000 |
| JP | 2000196673 A | 7/2000 |
| JP | 2000224648 A | 8/2000 |
| JP | 2000244603 | 9/2000 |
| JP | 2000253065 A | 9/2000 |
| JP | 2000253459 A | 9/2000 |
| JP | 2000261374 A | 9/2000 |

(56) References Cited

FOREIGN PATENT DOCUMENTS

| | | |
|---|---|---|
| JP | 2000269959 | 9/2000 |
| JP | 2000511733 T | 9/2000 |
| JP | 000513519 | 10/2000 |
| JP | 2000287192 | 10/2000 |
| JP | 2000295541 A | 10/2000 |
| JP | 2000324155 A | 11/2000 |
| JP | 2000349755 A | 12/2000 |
| JP | 2001007759 A | 1/2001 |
| JP | 2001007800 | 1/2001 |
| JP | 2001016179 A | 1/2001 |
| JP | 2001016253 A | 1/2001 |
| JP | 2001500327 | 1/2001 |
| JP | 200136941 | 2/2001 |
| JP | 2001036466 A | 2/2001 |
| JP | 2001045100 A | 2/2001 |
| JP | 2001053675 A | 2/2001 |
| JP | 2001077859 A | 3/2001 |
| JP | 2001119340 A | 4/2001 |
| JP | 2001134193 | 5/2001 |
| JP | 2001136507 A | 5/2001 |
| JP | 2001177513 A | 6/2001 |
| JP | 2001177523 A | 6/2001 |
| JP | 2001177564 A | 6/2001 |
| JP | 2001510970 | 8/2001 |
| JP | 2001512842 | 8/2001 |
| JP | 2001268535 A | 9/2001 |
| JP | 2001513587 | 9/2001 |
| JP | 200152164 T | 11/2001 |
| JP | 2001333032 A | 11/2001 |
| JP | 2002026835 | 1/2002 |
| JP | 2002027417 | 1/2002 |
| JP | 2002502204 A | 1/2002 |
| JP | 2002064785 A | 2/2002 |
| JP | 2002505458 T | 2/2002 |
| JP | 2002506296 | 2/2002 |
| JP | 2002084470 A | 3/2002 |
| JP | 2002152194 | 5/2002 |
| JP | 2002514024 | 5/2002 |
| JP | 2002175505 | 6/2002 |
| JP | 2002521879 T | 7/2002 |
| JP | 2002216040 | 8/2002 |
| JP | 2002217894 | 8/2002 |
| JP | 2002232418 A | 8/2002 |
| JP | 2002232962 | 8/2002 |
| JP | 2002300152 | 10/2002 |
| JP | 2002319936 A | 10/2002 |
| JP | 2002541685 | 12/2002 |
| JP | 2003503896 | 1/2003 |
| JP | 200352029 | 2/2003 |
| JP | 2003099327 A | 4/2003 |
| JP | 2003115832 | 4/2003 |
| JP | 2003124927 | 4/2003 |
| JP | 2003521843 T | 7/2003 |
| JP | 2003259284 A | 9/2003 |
| JP | 2003297015 A | 10/2003 |
| JP | 2003529963 | 10/2003 |
| JP | 2003339000 A | 11/2003 |
| JP | 2004048718 A | 2/2004 |
| JP | 200480663 | 3/2004 |
| JP | 2004507175 A | 3/2004 |
| JP | 2004532554 | 10/2004 |
| JP | 2004533174 | 10/2004 |
| JP | 2004343764 | 12/2004 |
| JP | 2005509367 | 4/2005 |
| JP | 2005512471 | 4/2005 |
| JP | 2005507572 | 5/2005 |
| JP | 2006518975 A | 8/2006 |
| KR | 20000062153 | 10/2000 |
| KR | 200130725 | 4/2001 |
| KR | 20010030696 | 4/2001 |
| RU | 2073913 C1 | 2/1997 |
| RU | 2077113 C1 | 4/1997 |
| RU | 2091983 C1 | 9/1997 |
| RU | 2115249 C1 | 7/1998 |
| RU | 2147792 C1 | 4/2000 |
| RU | 2187205 C2 | 8/2002 |
| TW | 353841 | 3/1999 |
| TW | 373372 | 11/1999 |
| TW | 388158 | 4/2000 |
| TW | 420910 B | 2/2001 |
| TW | 448658 | 8/2001 |
| TW | 502190 | 9/2002 |
| TW | 508958 B | 11/2002 |
| WO | 8301881 A1 | 5/1983 |
| WO | WO8607224 A1 | 12/1986 |
| WO | WO9611538 A2 | 4/1996 |
| WO | WO9715161 A1 | 4/1997 |
| WO | WO9716890 A2 | 5/1997 |
| WO | WO-9716924 A1 | 5/1997 |
| WO | WO9717790 A1 | 5/1997 |
| WO | WO9747094 | 12/1997 |
| WO | WO9748212 A1 | 12/1997 |
| WO | WO9810604 A1 | 3/1998 |
| WO | WO9825422 A1 | 6/1998 |
| WO | WO9857509 A2 | 12/1998 |
| WO | WO-9904583 A1 | 1/1999 |
| WO | WO9922466 A1 | 5/1999 |
| WO | WO9922478 A1 | 5/1999 |
| WO | WO9930234 A1 | 6/1999 |
| WO | WO-9939524 | 8/1999 |
| WO | WO9944114 A1 | 9/1999 |
| WO | WO9949595 A1 | 9/1999 |
| WO | WO9959355 A2 | 11/1999 |
| WO | WO9962231 A1 | 12/1999 |
| WO | WO9966657 A1 | 12/1999 |
| WO | WO0002406 A2 | 1/2000 |
| WO | WO004718 A1 | 1/2000 |
| WO | WO0008883 A1 | 2/2000 |
| WO | WO0013356 A1 | 3/2000 |
| WO | WO0033535 A1 | 6/2000 |
| WO | WO0036804 A1 | 6/2000 |
| WO | WO0041364 A1 | 7/2000 |
| WO | WO0048358 | 8/2000 |
| WO | WO0051308 A2 | 8/2000 |
| WO | WO0052880 A2 | 9/2000 |
| WO | WO0056018 A1 | 9/2000 |
| WO | WO0057601 A1 | 9/2000 |
| WO | WO0062476 | 10/2000 |
| WO | WO0062547 A1 | 10/2000 |
| WO | WO0074311 | 12/2000 |
| WO | WO0074425 A1 | 12/2000 |
| WO | WO0076125 A1 | 12/2000 |
| WO | WO0076234 A1 | 12/2000 |
| WO | WO0078008 A1 | 12/2000 |
| WO | WO0079734 A1 | 12/2000 |
| WO | WO0101630 A1 | 1/2001 |
| WO | WO0110146 A1 | 2/2001 |
| WO | WO0113358 | 2/2001 |
| WO | WO0117163 | 3/2001 |
| WO | WO0119027 A2 | 3/2001 |
| WO | WO01020805 | 3/2001 |
| WO | WO0145443 | 6/2001 |
| WO | WO01050783 | 7/2001 |
| WO | WO0156232 A2 | 8/2001 |
| WO | WO0208449 | 1/2002 |
| WO | 0215578 A1 | 2/2002 |
| WO | WO0247356 A2 | 6/2002 |
| WO | WO0247407 A2 | 6/2002 |
| WO | WO02054663 A2 | 7/2002 |
| WO | WO02061572 A1 | 8/2002 |
| WO | WO02080449 A1 | 10/2002 |
| WO | WO02080454 A2 | 10/2002 |
| WO | WO02096150 | 11/2002 |
| WO | WO03001772 | 3/2003 |
| WO | WO03032573 A2 | 4/2003 |
| WO | WO-03043310 A1 | 5/2003 |
| WO | WO-03051056 A1 | 6/2003 |
| WO | WO03051072 | 6/2003 |
| WO | WO03063418 A1 | 7/2003 |

(56) References Cited

FOREIGN PATENT DOCUMENTS

| WO | WO2004025895 A1 | 3/2004 |
|----|----|----|
| WO | WO2005008393 | 1/2005 |
| WO | WO2009130589 A1 | 10/2009 |

OTHER PUBLICATIONS

Baugher et al: "The Secure Real Time Transport Protocol (Draft 09)" Internet Engineering Task Force, AVT Working Froup, Internet -Draft, Jul. 2003, XP002320685.

Meier J D et al: "Building Secure ASP.NET Applications: Authentication, Authorization, and Secure Communication: Cryptography and Certificates" Microsoft Patterns & Practices, Nov. 2002, pp. 1-5, XP002321827.

William Stallings: "Cryptography and network security: Principles and Practice" Second Edition, 1999, Prentice Hall, New Jersey.

"Functional Model of a Conditional Access System", EBU Review—Technical European Broadcasting Union, Bussels, BE, No. 266; Dec. 21, 1995; pp. 64-77; XP000559450.

3G TS 25.213 V4.1.0 (Jun. 2001) 3rd Generation Partnership Project; Technical Specification Group Radio Access Network; Spreading and Modulation (FDD)(Release 4).

3GPP TS 25.211 V4.2.0 (Sep. 2001) 3rd Generation Partnership Project; Technical Specification Group Radio Access Network; Physical Channels and Mapping of Transport Channels Onto Physical Channels (FDD)(Release 4).

3GPP TS 25.212 V4.2.0 (Sep. 2001) 3rd Generation Partnership Project; Technical Specification Group Radio Access Network; Multiplexing and Channel Coding (FDD)(Release 4).

3GPP TS 25.214 V4.2.0 (Sep. 2001) 3rd Generation Partnership Project; Technical Specification Group Radio Access Network; Physical Layer Procedures (FDD)(Release 4).

3GPP2 C.S0002-0 Version 1.0 (Jul. 1999) 3rd Generation Partnership Project 2 "3GPP2" Physical Layer Standard for cdma2000 Spread Spectrum Systems.

Al-Tawil, "A New Authentication Protocol for Roaming Users in GSM", Proceedings for IEEE International Symposium on Computers and Communication, Jul. 6, 1999, pp. 93-99.

B.G. Marchent et al. "Intelligent Control of Mobile Multimedia Systems" Vehicular Technology Conference 1998. VTC 98, 48th IEEE Ottawa, Canada, May 18-21, 1998; New York, USA, May 18, 1998, pp. 2047-2051.

Baccelli, F. et al: "Self Organizing Hierarchical Multicast Trees and Their Optimization," INFOCOM 1999. IEEE, 1081-1089 (Mar. 21, 1999).

Berkovits, S. "How to Broadcast a Secret" Advances in Cryptology, Eurocrypt, International Conference on the Theory and Application of Cryptographic Techniques, Springer-Verlag, Delaware, Apr. 11, 1991, pp. 535-541.

Bormann, C., et al. "Robust Header Compression (ROHC)" Internet Draft, Dec. 2000, pp. 1-122, XP002901751 (pp. 4-5).

Bormann, et al., "Robust Header Compression (ROHC)," Internet Engineering Task Force IETF Draft, 1-145, Feb. 26, 2001.

Brown: "The Electronic Post It Note Model for Mobile Computing Applications," Computing Lab, The University, Canterbury, Kent, The Institution of Electrical Engineers, IEEE, Savoy Place, London, WC2R OBL, UK.

Estrin, et al., "The Protocol Independent Multicast-Sparse Mode (PIM-SM)," RFC 2362, Jun. 1998.

ETSI TR 125 925 V3.3.0: "Universal Mobile Telecommunications System (UMTS); Radio Interface for Broadcast/Multicast Services (3GPP TR 25.925 version 3.3.0 Release 1999)," XP002230388, pp. 1-35, (Dec. 2000).

ETSI:"Universal Mobile Telecommunications Systems (UMTS); Multimedia Broadcast/Multicast Service (MBMS); Stage 1, 3GPP TS 22.146 version 5.2.0 Release 5", ETSI TS 22.146 v5.2.0, pp. 1-15, Mar. 2002.

Farinacci, D., et al., "Generic Routing Encapsulation (GRE)," Network Working Group Request for Comments 2784, Mar. 1-8, 2000. URL:http://www.globecom.net/ieft/rfc/rfc2784.html (retrieved on Feb. 14, 2003).

FOLDOC, "Spread-spectrum communications", definition, dated Aug. 8, 2001, from http://foldoc.org/index.cgi?query=spread+spectrum.

Gong, L. et al: "Trade-Offs in Routing Private Multicast Traffic," Global Telecommunications Conference, 1995. IEEE, 2124-2128 (Nov. 13, 1995).

Greg Rose et al., "The Secure Real Time Transport Protocol," Internet Draft, Feb. 2001, pp. 1-26.

Handley, M. et al., "SDP: Session Description Protocol" Network Working Group, Request for Comments: 2327, Category: Standards Track. ISI/LBNL, Apr. 1998, pp. 1-42.

IEEE. "IEEE STD. 802.11, Part 11; Wireless LAN Medium Access Control (MAC) and Physical Layer (PHY) Specifications" 1997, pp. 60-70.

Jalali, A., et al. "Data Throughput of CDMA-HDR a High Efficiency-High Data Rate Personal Communication Wireless System," 2000 IEEE, pp. 1854-1858.

Jou, Y. "Developments in Third Generation (3G) CDMA Technology," 2000 IEEE, pp. 460-464.

Kalliokulju J.: "User Plane Architecture of 3rd Generation Mobile Telecommunication Network," IEEE International Conference on Networks, ICON, Proceedings on Networks (ICON'99), Sep. 28, 1999-Oct. 1, 1999, pp. 270-278, XP010354980.

Keeler, Robert E., "Interoperability Considerations for Digital HDTV," IEEE Transactions on Broadcasting, vol. 37, No. 4, Dec. 1991, pp. 128-130.

Lin, et al: "A Multicast Routing Protocol for Multihop Wireless Networks," Dept. of Computer Science and Information Engineering, Chung Cheng University, Taiwan, Global Telecommunications Conference, XP010373304.

Linuxguruz,: "Free On-Line Dictionary of Computing", § Internet Protocol, Dec. 2000.

Lou et al., "Progressive Video Streaming Over 2G and 3G Wireless Systems," Proceedings of the 11th IEEE International Symposium on Personal Indoor and Mobile Radio Communications, vol. 2, Sep. 18-21, 2000, London, pp. 1550-1554.

Macq. Benoit M. et al. "Cryptology for Digital TV Broadcasting", 1995 IEEE.

Marchent, B.G., et al. "Intelligent Control of Mobile Multimedia Systems" Vehicular Technology Conference 1998. VTC 98, 48th IEEE Ottawa, Canada, May 18-21, 1998; New York, USA, May 18, 1998, pp. 2047-2051.

Menezes et al.: "Key Layering and Cryptoperiods," Passage, Handbook of Applied Cryptography, CRC Press Series on Discrete Mathematics and its Applications, Boca Raton, FL, CRC Press, US, 1997, pp. 551-553, 557-581.

Menezes, A. et al.: "Handbook of Applied Cryptography" 1997, CRC Press LIC, USA XP002248262 pp. 497-500, 551-552.

Menezes, A. et al.: "Handbook of Applied Cryptography," Chapter 13, pp. 543-590, CRC Press (1996).

Miyazaki: "A Stream-data Multicast Protocol Using IP Unicast Address" Technical Report of IEICE, IN2001-9, May 11, 2001.

Mooij, W.: "Advances in Conditional Access Technology", IEEE, pp. 461-464 (Sep. 1997).

Moy, "Multicast Extensions to OSPF," RFC 1584, Mar. 1994.

Paul K et al: "A Stability-Based Distributed Routing Mechanism to Support Unicast and Multicast Routing in Ad Hoc Wireless Network" Computer Communications, Elsevier Science Publishers BV, Amsterdam, NL, vol. 24, No. 18, Dec. 1, 2001, pp. 1828-1845, XP0043.

Schneier, B.: "Applied Cryptography, Conference Key Distribution and Secret Broadcasting" Second Edition, pp. 520, 523-524, John Wiley & Sons, Inc. XP002248263 (1996).

Schneier, B.: "Applied Cryptography," Second Edition, pp. 170, 171, 173, John Wiley & Sons, Inc. (1996).

Schneier, B.: "Applied Cryptography," Second Edition, pp. 182-184, John Wiley & Sons, Inc. (1996).

Shannon, C.E., "A Mathematical Theory of Communication," The Bell System Technical Journal, vol. 27, pp. 379-423, 623-656, July, Oct. 1948.

Simpson, W., "PPP in HDLC-Like Framing," Network Working Group, Request for Comments: 1662 (RFC 1662), Jul. 1994, pp. 1-17.

(56) References Cited

OTHER PUBLICATIONS

Stallings, W.: "Cryptography and network security" 1995, Prentice-Hall, Inc., XP002248261 pp. 402-406, 413-417, 421-424.
Takahashi: "Prospect of Push type Information Providing Service/Technology," Information Processing, vol. 39, No. 11, Nov. 15, 1998, p. 1124-1131.
Tanenbaum, Andrew S.: Computer Networks, Third Edition; Pub. 1996; pp. 8, and 179-190.
Tanenbaum, Andrew S.: Computer Networks; Second Edition; PUB 1993 XP2530414.
TIA/EIA/IS-856 Interim Standard cdma2000 High Rate Packet Data Air Interface Specification (Nov. 2000).
TIA/EIA/IS-95-A (Revision of TIA/EIA/IS-95) Mobile Station-Base Station Compatibility Standard for Dual-Mode Wideband Spread Spectrum Cellular System (May 1995).
Toh C-K et al: "ABAM: On-Demand Associativity-Based Multicast Routing for AD HOC Mobile Networks," Vehicular Technology Conference, 2000. IEEE, 987-993 (2000).
Waitzman, et al., "The Distance Vector Multicast Routing Protocol (DVMRP)," RFC 1075, Nov. 1, 1998.
Yamaguchi, S., "Realization of Multimedia Communications", Unix Magazine, ASCII Corporation, Jun. 1, 1996, vol. 11, No. 6, pp. 45-53.
Yang et al: "An Efficient Multicast Delivery Scheme to Support Mobile IP," Database and Expert Systems Applications, 1999. IEEE, 638-88 (Sep. 1, 1999).
You Xiaohu, "D&R Progress on China's 3G Mobile Communications", Telecom Science, vol. 2, 2001, pp. 11-17.
030400 International Search Report and Written Opinion—PCT/US2004/021850, International Search Authority—ISA/US—Alexandria, Virginia—Dec. 9, 2004.
International Search Report and Written Opinion—PCT/US2004/021850, International search authority—ISA/US—Alexandria, Virginia—Dec. 9, 2004.
Asaka et al., "Dynamic Multicast Routing Using Predetermined Path Search". Technical Report of IEICE (The Institute of Electronics, Information and Communication Engineers), SSE95-56 IN99-37 CS99-78, Sep. 27, 1999.
Tadaumi, "IP Technology as Communication Infra," The Institute of Electronics Information and Communication Engineers, col. 83, No. 4, Apr. 2000, pp. 286-294.
Haverinen, et al., "EAP SIM Authentication" draft-haver inenpppext-eap-sim-11 .txt, [online] <URL:http:I/www.watersprings.orglpub/id/draft-haverinen-pppext-eap-sim- 11 .txt> Jun. 2003, pp. 1-64.
JNSA, "Trend of the Latest Security Protocol IPsecH-with Demonstration Experiment Report for Interconnection," Network Magazine, vol. 6, No. 6, Japan, Jun. 2001, vol. 6, pp. 86-93.
Okamoto, "Encryption Technology for Realizing a Bright Information Society 5: Management of Encryption Key Distribution", Bit, Japan, Kyoritsu Shuppan Co., Ltd., Nov. 1, 1991, vol. 23, No. 12, pp. 51-59.
Pelletier, et al., "Robust Header Compression (ROHC): A Profile for TCP/IP (ROHC-TCP)", Internet Draft, Feb. 21, 2005, pp. 1-2.
TIA/EIA/IS-95-B Mobile Station-Base Station Compatibility Standard for Dual-Mode Wideband Spread Spectrum Cellular System (IS-95 Standard), Feb. 3, 1999.
Alfred J. Menezes, Paul C. van Oorschot and Scott A. Vanstone. Handbook of Applied Cryptography, Crc Press. (Oct. 1996): p. 364 (in particular, refer to section 9.6.3), http://www.cacr.math.uwaterloo.ca/hac/about/chap9.pdf.
Bauer D., et al., "An error-control scheme for a multicast protocol based on round-trip time calculations" , Local Computer Networks, 1996., Proceedings 21st IEEE Conference on Minneapolis, MN, USA Oct. 13-16, 1996. Los Alamitos, CA, USA,IEEE Comput. Soc, US, Oct. 13, 1996, pp. 212-221, XP010200690, DOI: 10.1109/LCN. 1996.558149 ISBN: 978-0-8186-7617-8 * chapters 3 + 3.1 *.
Brown, D., "Techniques for Privacy and Authentication in Personal Communication Systems," IEEE Personal Communications, vol. 2, No. 4, pp. 6-10, Aug. 1995, doi: 10.1109/98.403452.
"Feature Story I: Evolution of Cellular Phones," ASCII, Dec. 1, 2000, vol. 24, No. 12, p. 204.
Haverinen H: "EAP SIM Authentication", 3GPP Draft; S3-010663_Draft-Haverinen-PPPEXT-EAP-SIM-0 2, 3rd Generation Partnership-Project (3GPP), Mobile Competence Centre ; 650, Route Des Lucioles ; F-06921 Sophia-Antipolis Cedex ; France, vol. SA WG3, no. Sophia; 20011128, Nov. 28, 2001, XP050271835, [retrieved on Nov. 28, 2001].
Mysore J. P., et al., "Performance of transport protocols over a multicasting-based architecture for Internet host mobility", Communications, 1998. ICC 98. Conference Record. 1998 IEEE International Conference on Atlanta, GA, USA Jun. 7-11, 1998, New York, NY, USA, IEEE, US, vol. 3, Jun. 7, 1998, pp. 1817-1823, XP010284635, DOI : 10.1109/ICC. 1998.683142 ISBN: 978-0-7803-4788-5 * abstract * * chapter 2 *.
Supplementary European Search Report—EP04777745, Search Authority—Berlin Patent Office: Dec. 14, 2010.
Taiwan Search Report—TW093120527—TIPO-2 011-08-07.
Yajnik M., et al., "Packet loss correlation in the MBone multicast network", Global Telecommunications Conference, 1996. GLOBECOM '96. Communications: The key to Global Prosperity London, UK Nov. 18-22, 1996, New York, NY, USA, IEEE. US, pp. 94-99, XP010220159, DOI: 10.1109/GLOCOM. 1996.586133 ISBN: 978-0-7803-3336-9 * chapter 3.1 *.
Ohnishi H., et al., "Proposed Scheme for Route Optimization on the Mobile IP Network," Technical Report of the Institute of Electronics, Information and Communication Engineers, SSE99-123 PS99-47, Dec. 17, 1999.
Taiwan Search Report—TW093120386—TIPO—Feb. 8, 2012.
R.Sinnarajah, Signaling Support for Broadcast Service, 3GPP2 TSG-C Contribution, 2002, C20-20020107-022, URL http://ftp. 3gpp2.org/TSGC/Working/2002/TSG-C-0201/TSG-C-0201-Vancouver/WG2/C20-20020107-020 (Signaling-Support-for-Broadcast-Service).doc.
Qualcomm Europe: "MBMS Security Framework", 3GPP TSG SA WG3 Security—S3 #29 S3-030356, Jul. 2003, MBMS Security and 3GPP-3GPP2 joint meeting.
Romkey J., "A Nonstandard for Transmission of IP Datagrams Over Serial Lines: Slip", rfc1055, IETF, Jun. 1988, URL, http://www.ietf.org/rfc/rfc1055.txt.
3GPP2 C.R1001-A, "Administration of Parameter Value Assignments for cdma2000 Spread Spectrum Standards Release C" Jul. 14, 2000, Version 2.0.
Chen T., et al.,"cdma2000 Broadcast Services Stage 2: System Design",C10-20010820-008,3GPP2, Aug. 20, 2001.
Haverinen, H., "GSM SIm Authentication and Key Generation for Mobile IP"; draft-haverinenmobileip-gsmsim-01.txt; Internet Engineering Task Force, IETF, CH; Nov. 2000; XP015014135.
Menezes Alfred J., et al.,"Handbook of Applied Cryptography," 1997 CRC Press, pp. 169-190.
Momona, M., et al., "Technologies and Standardization Activities in Cable TV Access Networks," IEICE Technical Report, Japan. The Institute of Electronics, Information and Communication Engineers (IEICE), Feb. 15, 1999. vol. 98, No. 589: pp. 57-64.

* cited by examiner

APPARATUS AND METHOD FOR A SECURE BROADCAST SYSTEM

CROSS-REFERENCE TO RELATED APPLICATIONS

The present Application for Patent claims priority to Provisional Application No. 60/485,791 entitled "Apparatus and Method for a Secure Broadcast System" filed Jul. 8, 2003, and assigned to the assignee hereof and hereby expressly incorporated by reference herein.

The present invention is related to the following applications, all of which are assigned to the assignee hereof.

Co-pending U.S. application Ser. No. 10/233,188 filed Aug. 28, 2002 and entitled "Method and Apparatus for Security in a Data Processing System," which is a continuation in part of U.S. application Ser. No. 09/933,972 filed Aug. 20, 2001 and entitled "Method and Apparatus for Security in a Data Processing System."

Co-pending U.S. Application Ser. No. 09/973,301 filed Oct. 9, 2001 and entitled "Method and Apparatus for Security in a Data Processing System."

BACKGROUND

I. Field of Invention

The invention generally relates to secure communication systems and more particularly, to access key management for multimedia broadcasting service in a mobile environment.

II. Description of the Related Art

Wireless communication systems are widely deployed to provide various types of communication such as voice, data, and so on. These systems may be based on code division multiple access (CDMA), time division multiple access (TDMA), or other modulation techniques.

A system may be designed to support one or more standards such as the "TIA/EIA-95-B Mobile Station-Base Station Compatibility Standard for Dual-Mode Wideband Spread Spectrum Cellular System" (the IS-95 standard); the "Global System for Mobile" (GSM) communication standard based on TDMA; the "Universal Mobile Telecommunications Service" (UMTS) standard which is a third generation wireless service based on GSM communication standard; the General Packet Radio System (GPRS) communication standard which is an evolutionary step from GSM toward UMTS; the standard offered by a consortium named "3rd Generation Partnership Project" (3GPP) which is embodied in a set of documents including Document Nos. 3G TS 25.211, 3G TS 25.212, 3G TS 25.213, and 3G TS 25.214, 3G TS 25.302 (the W-CDMA standard); the standard offered by a consortium named "3rd Generation Partnership Project 2" (3GPP2) which is embodied in "TR-45.5 Physical Layer Standard for cdma2000 Spread Spectrum Systems" (the IS-2000 standard). Each standard defines the processing of data for wireless communication between an infrastructure element, such as a base station, and a user end device, such as a mobile device.

Increasing demand for wireless data transmission and the expansion of services available via wireless communication technology have led to the development of specific data services. In one embodiment, a system may be configured to support multimedia broadcasting services (hereinafter "broadcast service"). Similar to television and/or radio broadcasting, broadcast service may be used for wireless transmission of multimedia content stream from a content provider to user end devices. Here, a content stream can be considered as equivalent to a television channel or radio station. Examples of multimedia content streams include audio and/or video data such as movies, sports events, news and various other programs and/or files. Typically, a service provider indicates the availability of such broadcast service to users. Users desiring broadcast service may receive broadcast service related parameters in overhead messages transmitted by infrastructure elements. When a user desires to receive certain content stream, the user end device reads the overhead messages and learns the appropriate configurations. The user end device then tunes to the channel or frequency containing the content stream, and receives broadcast service.

There are several possible subscription/revenue models for broadcast service, including free access, controlled access, and partially controlled access. For free access, no subscription is needed by the users to receive the service. Content is broadcasted without encryption such that user end devices of interested users can receive and view the content. The revenue for the service provider can be generated through advertisements that may also be transmitted in the broadcast channel. For example, upcoming movie-clips can be transmitted for which the studios will pay the service provider.

In controlled access, users are required to subscribe and become authorized to receive the broadcast service by paying a fee. This controlled access can be achieved by encrypting the broadcast service transmission or content with cryptographic access keys such that only subscribed users can decrypt and view the content. Here, the encryption of the broadcast content may be based on symmetric or asymmetric cryptosystems. In symmetric cryptosystems, the same keys are used for encryption/decryption and in asymmetric cryptosystems, different keys are used for encryption/decryption. Cryptography is well known to those skilled in art and will not be further described in detail. A hybrid access scheme or partial controlled access provides broadcast service as a subscription-based service that is encrypted with intermittent unencrypted advertisement transmissions. These advertisements may be intended to encourage subscriptions to the encrypted broadcast service.

For controlled or partially controlled broadcast service, a problem exists in the secure provision of the access key from a content provider to one or more recipients. Therefore, there is a need for a secure way to provision an access key to end user devices. More particularly, the provisioning of the access key needs to conform with existing standards and corresponding infrastructures as well as evolving standards and corresponding infrastructures.

SUMMARY

Embodiments disclosed herein address the above stated needs by enabling a secure provision of access key to end user devices.

In one embodiment, a method for secure processing in a device that securely stores a secret key comprises receiving a plurality of challenges from a network; generate a plurality of ciphering keys based on the secret key and the plurality of challenges; and generating an access key based on the plurality of ciphering keys. The method may further comprise using the plurality of challenges and the secret key to generate a plurality of authentication responses; and sending at least one authentication response to the network. Generation of the access key may comprise generating a broadcast access key; and wherein the method further comprises: receiving encrypted broadcast content; and decrypting the broadcast content based on the broadcast access key. Decryption of the content may comprises: generating a temporary decryption key based on each challenge and the broadcast access key; and decrypting the broadcast content using the temporary decryption key.

In another embodiment, apparatus for secure processing in a device having means for securely storing a secret key comprises means for generating a plurality of ciphering keys based on a plurality of challenges received from a network and the secret key; and means for generating an access key based on the plurality of ciphering keys.

In still another embodiment, a machine readable medium for use in a device that securely stores a secret key and receives a plurality of challenges from a network is disclosed. The machine readable medium comprises codes for generating a plurality of ciphering keys based on the plurality of challenges and the secret key; and codes for generating an access key based on the plurality of ciphering keys.

In the above embodiments, a 128 bit subscriber authentication key may be stored as the secret key in a subscriber identity module of a mobile phone using Global System for Mobile communication standard. A 128 bit subscriber authentication key may also be stored as the secret key in a universal subscriber identity module of a mobile phone using Universal Mobile Telecommunications System standard. Moreover, 64 bit ciphering keys may be generated and a 128 bit broadcast access key may be generated using two ciphering keys.

In a further embodiment, an apparatus for use in a mobile phone comprising: an integrated circuit card (ICC) configured to securely store a secret key and to generate a plurality of ciphering key based on the secret key and a plurality of challenges received from a network; and a processor coupled to the ICC and configured to generate an access key based on the plurality of ciphering keys. The ICC may be a subscriber identity module (SIM) of a mobile phone using Global System for Mobile communication standard. SIM may store a 128 bit subscriber authentication key as the secret key and generate 64-bit ciphering keys. The ICC may also be a universal subscriber identity module (USIM) of a mobile phone using Universal Mobile Telecommunications System standard. USIM may store a 128 bit subscriber authentication key as the secret key and generate 64-bit ciphering keys in a mode that is backward compatible with the SIM. The processor may generate a 128 bit broadcast access key using two ciphering keys.

BRIEF DESCRIPTION OF THE DRAWINGS

Various embodiments will be described in detail with reference to the following drawings in which like reference numerals refer to like elements, wherein.

DETAILED DESCRIPTION

In the following description, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary detail. In other instances, well-known circuits, structures and techniques may be shown in detail in order not to obscure the embodiments.

Also, it is noted that the embodiments may be described as a process which is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, as disclosed herein, a storage medium may represent one or more devices for storing data, including read only memory (ROM), random access memory (RAM), magnetic disk storage mediums, optical storage mediums, flash memory devices and/or other machine readable mediums for storing information. The term "machine readable medium" includes, but is not limited to, portable or fixed storage devices, optical storage devices, wireless channels and various other mediums capable of storing, containing or carrying instruction(s) and/or data.

Figure 1:
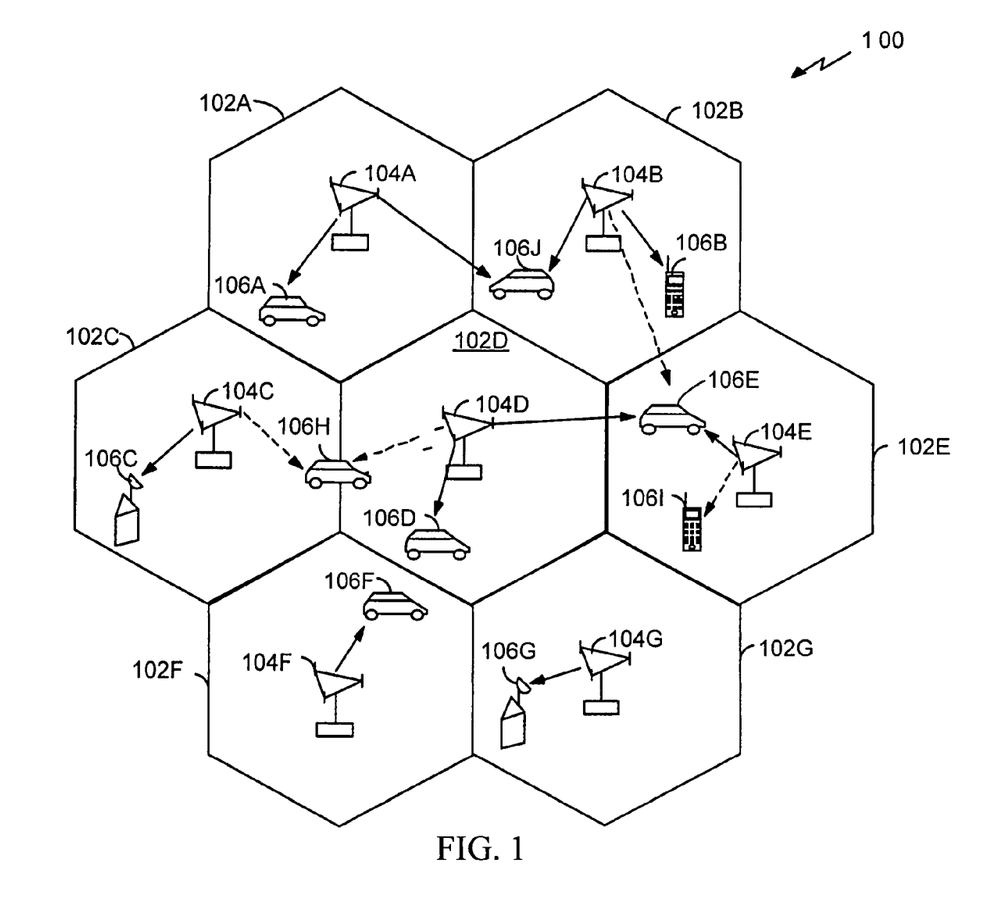
FIG. 1 is an example wireless communication capable of supporting broadcast service.

FIG. 1 shows an example of a wireless communications network 100 capable of supporting broadcast service. Network 100 may comprise one or more communication systems supporting different standards. More particularly, network 100 comprises a plurality of service areas 102A-102G, each of which is serviced by a corresponding infrastructure element 104A-104G, respectively. Infrastructure elements 104A-104G communicate with user end devices (hereinafter "terminal") 106A-106J that are within service areas 102A-102G of infrastructure elements 104A-104G, respectively. Depending on the type of communication system, infrastructure elements 104A-104G may include base stations, base transceiver station, gateways or other devices that communicates with terminals 106A-106J. Terminals 106A-106J may be, but is not limited to, a mobile (including cellular and personal communications service) phone, wired phone, a wireless handset, a personal data assistant (PDA), various computer devices (including laptop and desktop) or other data transceiver. As shown in FIG. 1, terminals 106A-106J can be hand-held, mobile, portable as in vehicle mounted (including cars, trucks, boats, trains, and planes) or fixed (stationary).

In one embodiment, network 100 supports a broadcast service referred to as Multimedia Broadcast/Multicast Service (MBMS), or sometimes referred to as Broadcast/Multimedia Service (BCMCS). Generally, MBMS is a packet data service based on the Internet Protocol (IP). A service provider may indicate the availability of such MBMS to users. The users desiring MBMS may receive the service and discover the broadcast service schedule through broadcasts such as advertisements, Short Message System (SMS), and Wireless Application Protocol (WAP). Infrastructure elements transmit MBMS related parameters in overhead messages. When a user desires to receive a broadcast session, a terminal 106 reads the overhead messages and learns the appropriate configurations. Terminal 106 then tunes to the frequency containing the MBMS channel, and receives the broadcast service content.

Figure 2:
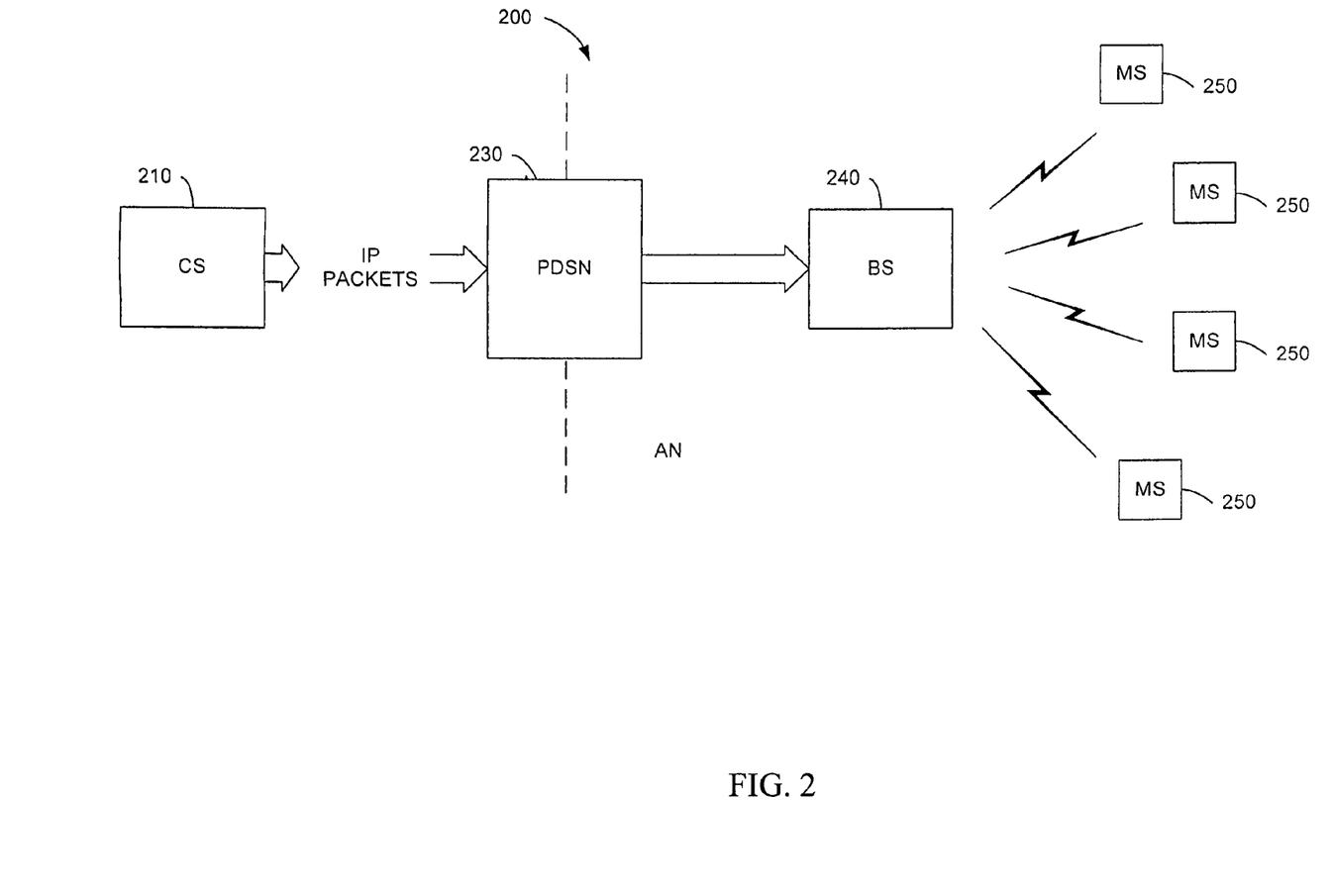
FIG. 2 shows a simplified network for implementing MBMS.

FIG. 2 shows a simplified network 200 for implementing MBMS. In network 200, video and/or audio information is provided to Packetized Data Service Network (PDSN) 230 by a Content Source (CS) 210. The video and audio information may be from televised programs or radio transmissions. The information is provided as packetized data, such as in IP packets. PDSN 230 processes the IP packets for distribution within an Access Network (AN). As illustrated, AN is defined as the portions of network 200 including an infrastructure element 240 in communication with a plurality of terminals 250.

For MBMS, CS 210 provides unencrypted content. Infrastructure element 240 receives the stream of information from PDSN 230 and provides the information on a designated channel to subscriber terminals within network 200. To control access, the content from CS 210 is encrypted by a content encryptor (not shown) using an encryption key before being provided to PDSN 220. While content encryptor may be implemented together or separately from CS 210, content encryptor and CS 210 will hereinafter be referred to as a content provider. The subscribed users are provided with the decryption key so that the IP packets can be decrypted.

Figure 3:
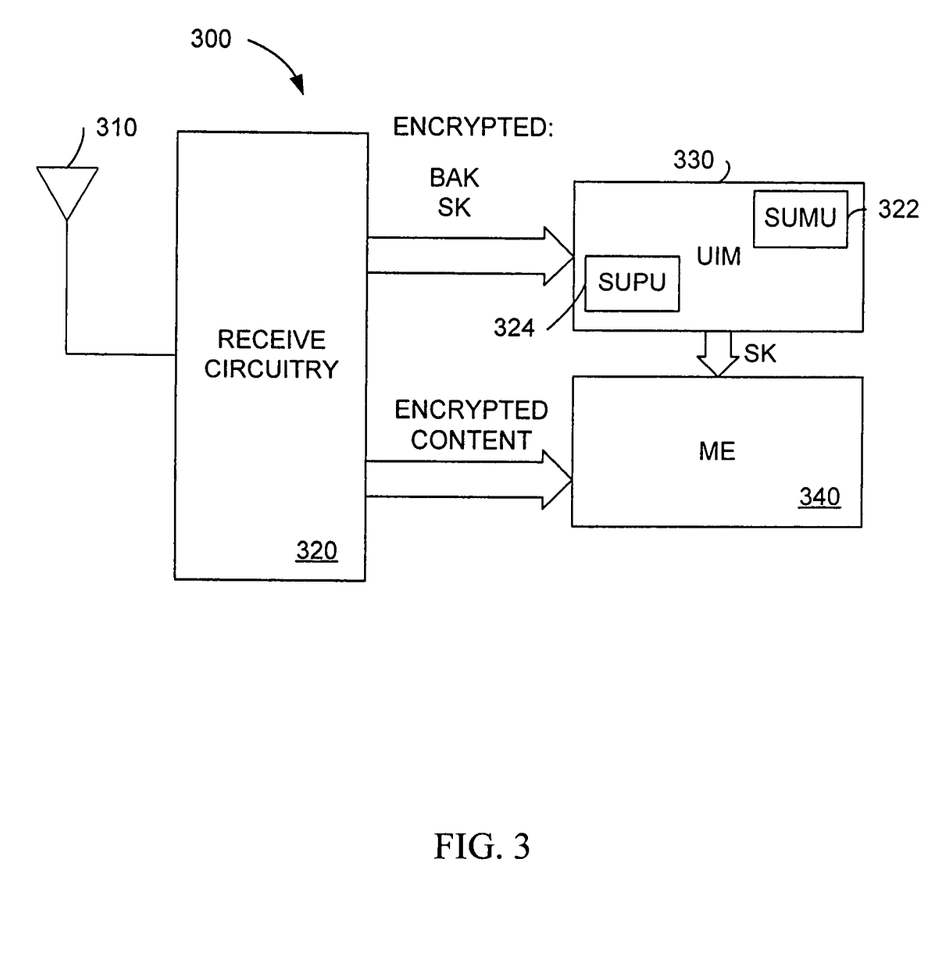
FIG. 3 shows a terminal capable of subscribing to MBMS to receive multimedia content.

More particularly, FIG. 3 shows a terminal 300 capable of subscribing to MBMS to receive multimedia content. Terminal 300 comprises an antenna 310 coupled to a receive circuitry 320. Terminal 300 receives transmissions from a content provider (not shown) through an infrastructure element (not shown). Terminal 300 includes a Mobile Equipment 340 and a Universal Integrated Circuit Card (UICC) 330 coupled to receive circuitry 320. It is to be noted that in some terminals, UICC 330 and ME 340 may be implemented together in one secure processing unit. Also, although the embodiment will be described using UICC, other integrated circuits and/r secure processing units, such as User Identification Module (UIM), Subscriber Identity Module (SIM) or universal SIM, may be implemented in a terminal.

Generally, UICC 330 applies verification procedures for security of the MBMS transmission and provides various keys to ME 340. ME 340 performs substantial processing, including, but not limited to, decryption of MBMS content streams using the keys provided by UICC 330. UICC 330 is trusted to securely store and process secret information (such as encryption keys) that should remain secret for a long time. As UICC 330 is a secure unit, the secrets stored therein do not necessarily require the system to change the secret information often. UICC 330 may include a processing unit referred to as a Secure UICC Processing Unit (SUPU) 324 and a secure memory storage unit referred to as a Secure UICC Memory Unit (SUMU) 322. Within UICC 330, SUMU 322 stores secret information in a way that discourages unauthorized access to the information. If the secret information is obtained from UICC 330, the access will require significantly large amount of resources. Also within UICC 330, SUPU 324 performs computations on values that may be external to and/or internal to UICC 330. The results of the computation may be stored in SUMU 322 or passed to ME 340.

In one embodiment, UICC 330 is a stationary unit or integrated within terminal 300. Note that UICC 330 may also include non-secure memory and processing (not shown) for storing information including telephone numbers, e-mail address information, web page or URL address information, and/or scheduling functions, etc. Alternative embodiments may provide a removable and/or reprogrammable UICC. Typically, SUPU 332 does not have significant processing power for functions beyond security and key procedures, such as to allow encryption of the broadcast content of MBMS. However, alternative embodiments may implement a UICC having stronger processing power.

While UICC 330 is a secure unit, data in ME 340 may be accessed by a non-subscriber and is said to be insecure. Any information passed to ME 340 or processed by the ME 340 remains securely secret for only a short amount of time. It is therefore desired that any secret information, such as key(s), shared with ME 340 be changed often.

More particularly, MBMS content is encrypted using a unique and frequently changing temporary encryption keys referred to as short-term key (SK). In order to decrypt the broadcast content at a particular time, ME 340 must know the current SK. The SK is used to decrypt the broadcast content for a short-amount of time such that SK can be assumed to have some amount of intrinsic monetary value for a user. For example, this intrinsic monetary value may be a portion of the registration costs. Here, different content types may have different intrinsic monetary value. Assuming that the cost of a non-subscriber obtaining SK from ME 340 of a subscriber exceeds the intrinsic monetary value of SK, the cost of obtaining SK illegitimately exceeds the reward and there is no benefit. Consequently, there is no need to protect SK in ME 340. However, if a broadcast has an intrinsic value greater than the cost of illegitimately obtaining this secret key, there is a benefit to the non-subscriber in obtaining such a key from ME 340. Hence, ME 340 ideally will not store secrets with a lifetime longer than that of an SK.

In addition, the channels used by a content provider (not shown) for transmission of data are considered insecure. Therefore, SK is not transmitted over the air. It is derived either by UICC 330 or ME 340 from an access key called a broadcast access key (BAK) and SK information (SKI) broadcasted along with the encrypted content. BAK may be used for a certain amount of time, for example one day, one week or a month, and is updated. Within each period for updating the BAK, a shorter interval is provided during which SK is changed. The content provider may use a cryptographic function to determine two values SK and SKI such that SK can be determined from BAK and SKI. In one embodiment, SKI may contain SK that is encrypted using BAK as the key. Alternatively, SK may be a result of applying a cryptographic hash function to the concatenation of SKI and BAK. Here, SKI may be some random value.

To obtain access to MBMS, a user registers and subscribes to the service. In one embodiment of the registration process, a content provider and UICC 330 agree on a Registration Key or root key (RK) that serves as a security association between the user and the content provider. The registration may occur when a user subscribes to a broadcast channel offered by the content provider or may occur prior to subscription. A single content provider may offer multiple broadcast channels. The content provider may choose to associate users with the same RK for all channels or require users to register for each channel and associate the same user with different RKs on different channels. Multiple content providers may choose to use the same registration keys or require the user to register and obtain a different RK.

If possible, RK is then kept as a secret in UICC 330. RK is unique to a given UICC, i.e., each user is assigned a different RK. However, if a user has multiple UICCs, then these UICCs may be configured to share the same RK depending on the policies of the content provider. The content provider may then send UICC 330 further secret information such as BAK encrypted with RK. UICC 330 is able to recover the value of the original BAK from the encrypted BAK using the RK. Since ME 340 is not a secret unit, UICC 330 does not provide BAK to ME 340.

The content provider also broadcasts SKI that is combined with the BAK in UICC 330 to derive SK. UICC 330 then passes SK to ME 340 and ME 340 uses the SK to decrypt encrypted broadcast transmissions received from a content provider. In this way, the content provider can efficiently distribute new values of SK to subscribed users.

As described, controlled access may be achieved by provisioning an agreed upon RK in SUMU 334 of UICC 330. However, in the existing infrastructure of some systems, an appropriate value of RK cannot be kept in a secure unit such as UICC 330, because of the cost and/or inconvenience of replacing existing UICCs, SIMs, UIMs or other Integrated Circuit Cards.

Figure 4:
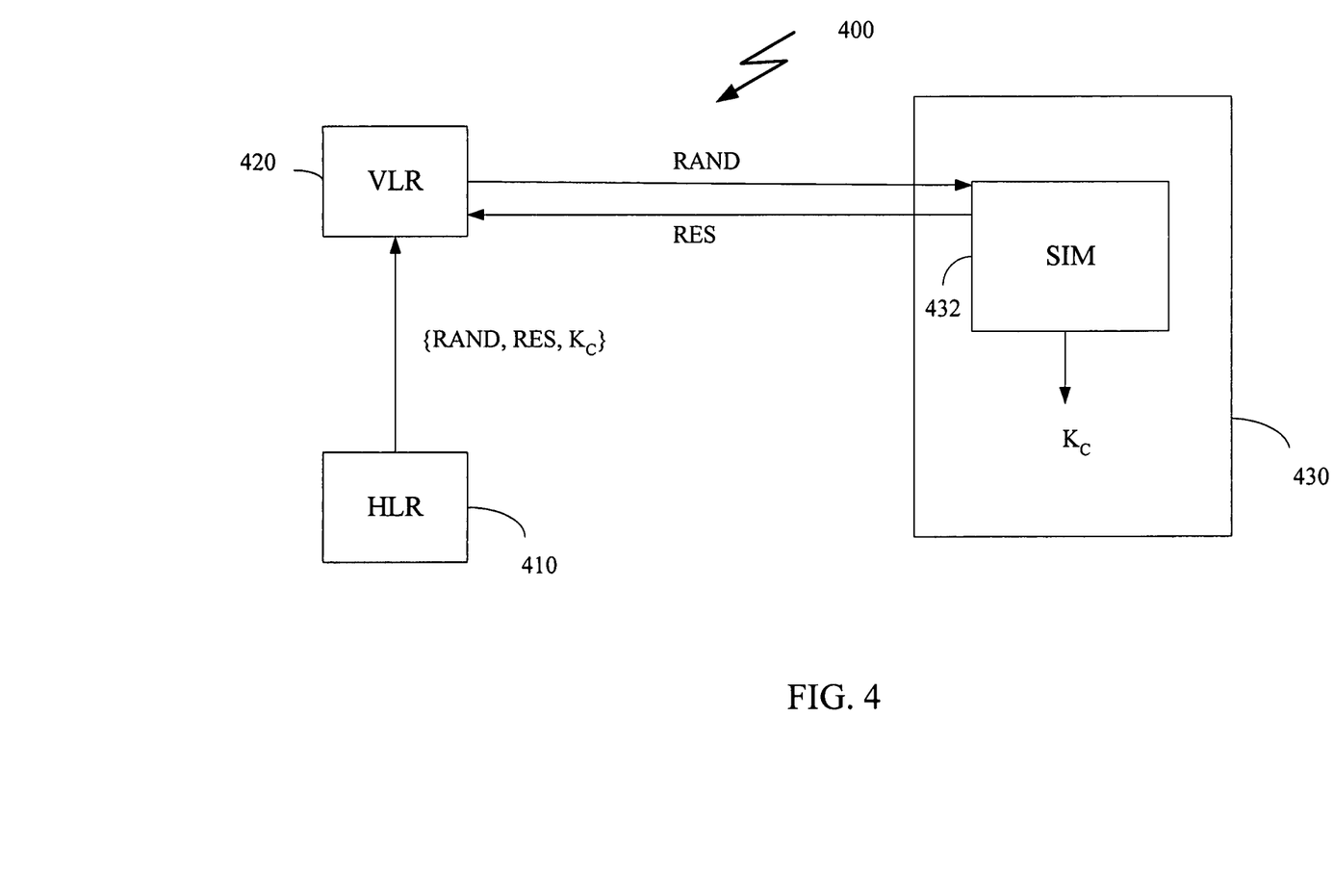
FIG. 4 a simplified example of a GSM system.

For example, in GSM systems, a Subscriber Identity Module (SIM) is the secure unit and contains subscriber identifying data about a user that can be used to gain access to a network. For purposes of explanation, FIG. 4 shows a simplified example of a GSM system 400 for authenticating a subscriber to allow access to a network. System 400 comprises a Home Location Register (HLR) 410, a Visitor Location Register (VLR) 420 and a terminal such as a mobile device 430. Note that system 400 comprise of additional elements, but GSM systems are well known to those skilled in the art and will not be described in detail.

HLR 410 is a subscriber database for a mobile system. HLR 410 is maintained by a terminal's home carrier and contains important user information for billing and for authentication to a network. VLR 420 is also a database and contains temporary user information, such as the current location of a terminal, to manage requests from subscribers who are out of the area covered by their home system. When a user initiates a call and the terminal of the user is our of the home area, VLR 420 communicates with HLR 410 to obtain information required to process a call, including information required to authenticate the subscriber.

Terminal 430 comprises a SIM module 432 that securely contains a subscriber authentication key (K) used to authenticate a subscriber. Here, a challenge-handshake authentication protocol known as Authenticated Key Agreement (AKA) is typically used for GSM authentication. In AKA, a network sends a challenge message to a subscriber terminal, which responds with a value obtained using a one-way hash function. Here, the challenge message may be a random value. The network checks the response by comparing it with its own expected hash value. If the values match, the authentication is acknowledged. While generating this response, a key that can be used to secure subsequent communications is also generated.

More particularly, in GSM system, VLR 420 requests authentication parameters from HLR 410. HLR 410 sends to VLR a 128 bit random number RAND, a signed response (RES) and a ciphering key (Kc). The RES and Kc are both generated from the subscriber authentication key K and RAND, by using different algorithms. Using this Authentication Triplet (RAND, RES, Kc), a challenge message is issued by sending the random number RAND to Terminal 430. The received RAND is passed to SIM 432 which generates RES and Kc using RAND and K. The generated RES is returned to VLR 420 which checks that the two values of RES match. If they match, the subscriber is authenticated and both terminal and network begin to encrypt/decrypt using Kc.

While GSM SIM securely contains a subscriber authentication key (K) used to authenticate a subscriber, it does not allow provisioning of an additional key such as RK. Namely, existing GSM SIMs cannot be changed. Therefore, one way to deliver BAK for broadcast service may be to use Kc rather than RK to encrypt BAK. A content provider would send a message containing RAND and BAK encrypted with Kc. A terminal receives the message and forwards the RAND to the SIM as if it was a normal GSM authentication. Accordingly, RES and Kc is generated by SIM using RAND and K. Here, the RES generated by SIM may be discarded. This protects against an attacker that might send the same RAND and record the returned RES for unauthorized access. The Kc may be used to decrypt the encrypted BAK.

However, Kc is typically a 64 bit key while some broadcast service such as MBMS is designed to give 128 bit security. Therefore, it is necessary to use a key as longer than 64 bits to encrypt BAK. As a result, a plurality of triplets is used for encryption of BAK.

Figure 5:
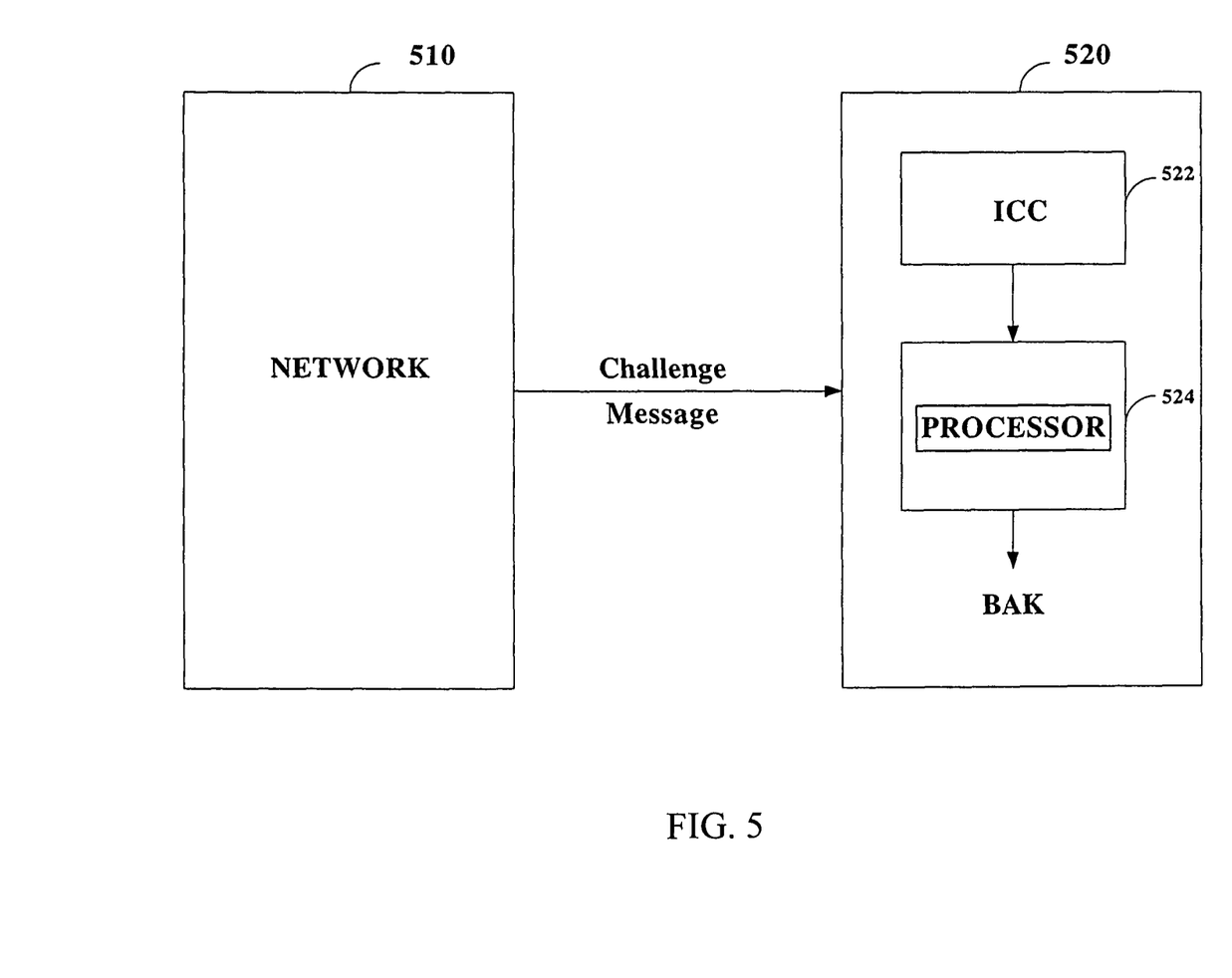
FIG. 5 is an example system with a network that performs authentication and a terminal for broadcast service.

FIG. 5 shows an example system 500 with a network 510 that performs authentication and terminal 520 for broadcast service. Network 510 comprises one or more content providers and other infrastructure elements necessary for broadcast service. Terminal 520 comprises ICC 522 coupled to a processor 524. In GSM system, network 510 may comprise a VLR and HLR, and ICC 522 would be a SIM module as described in FIG. 4. Generally, network 510 sends challenge messages for performing authentication. The challenge messages are used by terminal 520 to generate BAK for controlled access. Namely, ICC 522 of terminal 510 securely stores a secret key used in the generation of BAK. The operation of system 500 will be explained with reference to FIG. 6 below.

Figure 6:
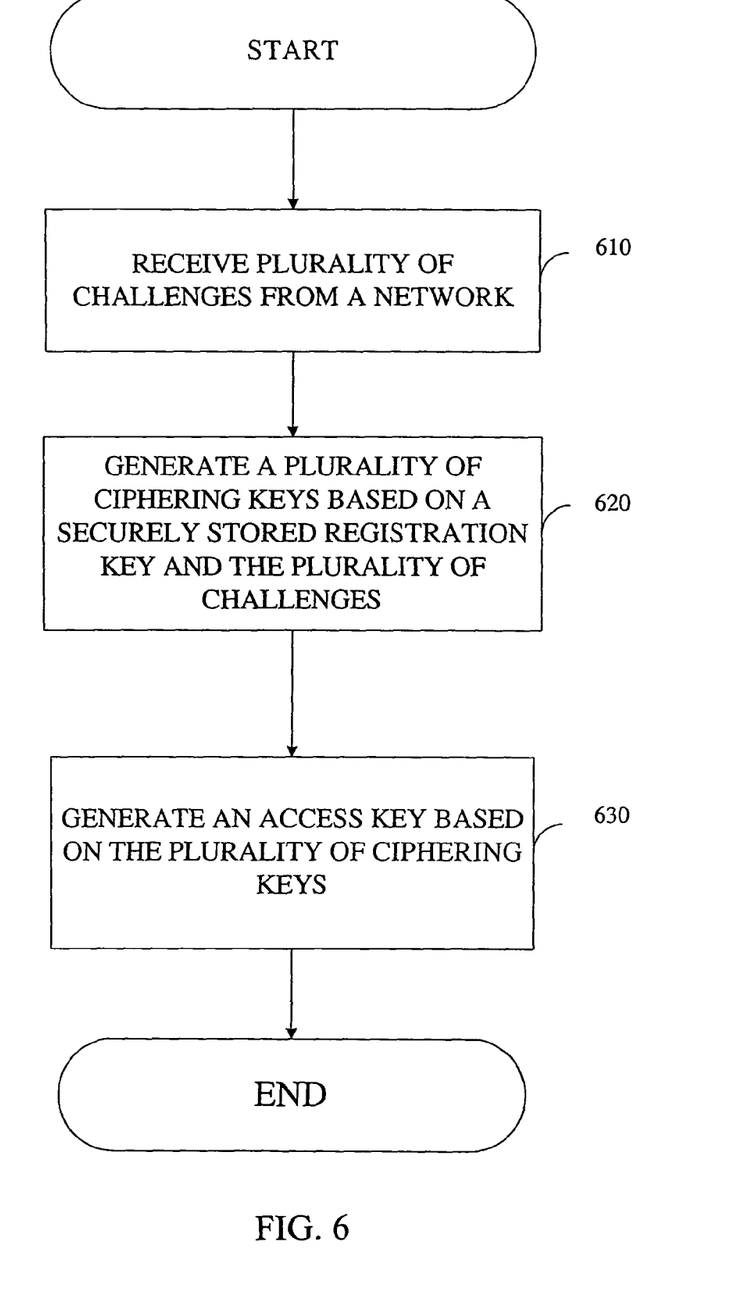
FIG. 6 shows a method for secure processing in a device that securely stores a secret key.

FIG. 6 shows a method 600 for secure processing in a device such as terminal 620, that securely stores a secret key such as a subscriber authentication key in a secure unit such as ICC 622. In method 600, the device receives a plurality of challenges from a network (610). The plurality of challenges may be in one message or a plurality of messages. A plurality of ciphering keys are generated based on the secret key and the plurality of challenges (620). The access key is then generated based on the plurality of ciphering keys (630). In system 500, for example, ICC 522 is configured to generate the ciphering keys as the secret key should be kept within ICC 522. Processor 524 is configured to generate the access key based on the ciphering keys.

The access key is generated using a plurality of ciphering keys because the access key is typically longer than a ciphering key. For example, in GSM for MBMS, the ciphering key is 64 bits while the access key is 128 bits. In such case, the access key can be generated using two ciphering keys. Any known technique may be used to generate an access key from the plurality of ciphering keys. In one embodiment, the access key is generated by concatenating the plurality of ciphering keys. In an alternative embodiment, the access key is generated using a hash function on the plurality of ciphering keys. The hash function may comprise SHA-1 to mix the plurality of ciphering keys.

For authentication, method 600 may further comprise using the plurality of challenge messages and the secret key to generate a plurality of authentication responses as described with reference to FIG. 4. Thereafter, at least one of the authentication response is returned to the network using a transmitter (not shown) implemented in terminal 520 and any authentication responses not sent to the network may be discarded.

Therefore, after generating the access key, method 600 may further comprise receiving encrypted broadcast content and decrypting the broadcast content based on the access key. For example in MBMS, the access key would be the BAK and SKI would be used to generate SK. In such case, method 600 may further comprise generating a temporary encryption/decryption key such as SK based on each challenge message and current BAK. The current SK can then be used to decrypt and view/process encrypted content.

Accordingly, embodiments described allow a secure provisioning of an access key for broadcast service. It is to be noted here that although the embodiments have been described with reference to MBMS, the scope of the invention applies to broadcast services other than MBMS and to various systems requiring controlled access. Similarly, the access key may be shorter or longer than 128 bits. Moreover, the embodiments may apply to systems other than GSM system. For example, UMTS systems have a USIM which is analogous to GSM SIM and has a backward compatibility mode allowing it to act as a GSM SIM.

Furthermore, embodiments may be implemented by hardware, software, firmware, middleware, microcode, or any combination thereof. When implemented in software, firmware, middleware or microcode, the program code or code segments to perform the necessary tasks may be stored in a machine readable medium (not shown). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc. Also, the machine readable medium may be implemented in an article of manufacture for use in a computer system and may have machine readable code means embodied therein Finally, it should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method operational on a user terminal for secure processing in a device that securely stores a secret key, the user terminal in communication with a network that broadcasts to a plurality of user terminals, the method operational on the user terminal comprising:
   receiving a plurality of random challenges from the network;
   generating a plurality of ciphering keys based on the secret key and the plurality of random challenges;
   generating an access key based on the plurality of ciphering keys;
   generating a plurality of authentication responses using the plurality of random challenges and the secret key;
   sending at least one authentication response, from the plurality of authentication responses, to the network; and
   discarding any authentication responses, from the plurality of authentication responses, not sent to the network.

2. The method of claim 1, wherein receiving a plurality of challenges comprises:
   receiving a plurality of random values.

3. The method of claim 1, wherein the access key is longer than a ciphering key.

4. The method of claim 3, wherein generating the access key comprises:
   concatenating the plurality of ciphering keys.

5. The method of claim 3, wherein generating the access key comprises:
   using a hash function on the plurality of ciphering keys.

6. The method of claim 5, wherein the hash function comprises SHA-1 to mix the plurality of ciphering keys.

7. The method of claim 1, wherein storing the secret key comprises:
   storing a 128 bit subscriber authentication key as the secret key in a subscriber identity module of a mobile phone using Global System for Mobile communication standard.

8. The method of claim 7, wherein generating the plurality of ciphering keys comprises generating 64-bit ciphering keys; and
   wherein generating the access key comprises generating a 128 bit broadcast access key using two ciphering keys.

9. The method of claim 1, wherein storing the secret key comprises:
   storing a 128 bit subscriber authentication key as the secret key in a universal subscriber identity module of a mobile phone using Universal Mobile Telecommunications System standard.

10. The method of claim 9, wherein generating the plurality of ciphering keys comprises generating 64-bit ciphering keys; and
    wherein generating the access key comprises generating a 128 bit broadcast access key using two ciphering keys.

11. The method of claim 1, wherein generating the access key comprises generating a broadcast access key; and wherein the method further comprises:
    receiving encrypted broadcast content; and
    decrypting the broadcast content based on the broadcast access key.

12. The method of claim 11, wherein the decrypting the content comprises:
    generating a temporary decryption key based on each random challenge and the broadcast access key; and
    decrypting the broadcast content using the temporary decryption key.

13. Apparatus for use in a mobile phone, the apparatus in communication with a network that broadcasts to a plurality of user terminals, the apparatus comprising:
    an integrated circuit card (ICC) configured to securely store a secret key and to generate a plurality of ciphering key based on the secret key and a plurality of random challenges received from the network;
    a processor coupled to the ICC and configured to generate an access key based on the plurality of ciphering keys; and
    a transmitter coupled to the ICC,
    wherein the ICC uses the plurality of challenges and the secret key to generate a plurality of authentication responses, the transmitter is configured to send at least one authentication response, from the plurality of authentication responses, to the network, and the transmitter is configured to discard any authentication responses, from the plurality of authentication responses, not sent to the network.

14. The apparatus of claim 13, wherein the plurality of random challenges comprises a plurality of random values.

15. The apparatus of claim 13, wherein the ICC is a subscriber identity module (SIM) of a mobile phone using Global System for Mobile communication standard.

16. The apparatus of claim 15, wherein the SIM stores a 128 bit subscriber authentication key as the secret key and generates 64-bit ciphering keys; and wherein the processor generates a 128 bit broadcast access key using two ciphering keys.

17. The apparatus of claim 13, wherein the ICC is a universal subscriber identity module (USIM) of a mobile phone using Universal Mobile Telecommunications System standard.

18. The apparatus of claim 17, wherein the USIM stores a 128 bit subscriber authentication key as the secret key and generates 64-bit ciphering keys; and wherein the processor generates a 128 bit broadcast access key using two ciphering keys.

19. The apparatus of claim 13, wherein the receiver receives encrypted broadcast content; and wherein the processor generates a broadcast access key to decrypt the broadcast content.

20. Apparatus for use in a mobile phone, the apparatus in communication with a network that broadcasts to a plurality of user terminals, the apparatus comprising:
means for receiving a plurality of random challenges from the network;
means for generating a plurality of ciphering keys based on the plurality of random challenges and the secret key;
means for generating an access key based on the plurality of ciphering keys;
means for generating a plurality of authentication responses using the plurality of challenges and the secret key;
means for sending at least one authentication response, from the plurality of authentication responses, to the network; and
means for discarding any authentication responses, from the plurality of authentication responses, not sent to the network.

21. The apparatus of claim 20, wherein the means for generating the access key comprises:
means for concatenating the plurality of ciphering keys.

22. The apparatus of claim 20, wherein the means for generating the access key comprises:
means for using a hash function on the plurality of ciphering keys.

23. The apparatus of claim 20, wherein the means for securely storing the secret key is a subscriber identity module (SIM) of a mobile phone using Global System for Mobile communication standard, and wherein the secret key is a subscriber authentication key.

24. The apparatus of claim 23, wherein the SIM stores a 128 bit subscriber authentication key and comprises means for generating 64-bit ciphering keys; and
wherein the means for generating the access key comprises means for generating a 128 bit broadcast access key using two ciphering keys.

25. The apparatus of claim 20, wherein the means for securely storing the secret key is a universal subscriber identity module (USIM) of a mobile phone using Universal Mobile Telecommunications System standard, and wherein the secret key is a subscriber authentication key.

26. The apparatus of claim 25, wherein the USIM stores a 128 bit subscriber authentication key and comprises means for generating 64-bit ciphering keys; and
wherein the means for generating the access key comprises means for generating a 128 bit broadcast access key using two ciphering keys.

27. The apparatus of claim 20, wherein the means for generating the access key generates a broadcast access key; and wherein the apparatus further comprises:
means for receiving encrypted broadcast content; and
means for decrypting the broadcast content based on the broadcast access key.

28. A non-transitory machine readable medium for use in a device that securely stores a secret key, the device in communication with a network that broadcasts to a plurality of user terminals, the machine readable medium comprising:
codes for receiving a plurality of random challenges from the network;
codes for generating a plurality of ciphering keys based on the plurality of random challenges and the secret key;
codes for generating an access key based on the plurality of ciphering keys;
codes for generating a plurality of authentication responses using the plurality of challenges and the secret key;
codes for sending at least one authentication response, from the plurality of authentication responses, to the network; and
codes for discarding any authentication responses, from the plurality of authentication responses, not sent to the network.

29. The non-transitory machine readable medium of claim 28, wherein the codes for generating the access key comprises:
codes for concatenating the plurality of ciphering keys.

30. The non-transitory machine readable medium of claim 28, wherein the codes for generating the access key comprises:
codes for using a hash function on the plurality of ciphering keys.

31. The non-transitory machine readable medium of claim 28, wherein the device receives encrypted broadcast content, wherein the codes for generating the access key generates a broadcast access key; and wherein the machine readable medium further comprises:
codes for decrypting the broadcast content based on the broadcast access key.

32. The method of claim 1, wherein the network includes one or more content providers.

33. The method of claim 1, wherein the network broadcasts the plurality of random challenges to the plurality of user terminals in addition to the user terminal.

34. The method of claim 1, wherein the at least one authentication response sent to the network is a subset of the plurality of authentication responses.

* * * * *